(12) United States Patent
Kim et al.

(10) Patent No.: US 9,379,867 B2
(45) Date of Patent: Jun. 28, 2016

(54) APPARATUS AND METHOD FOR EFFICIENTLY OPERATING FAST FEEDBACK CHANNEL IN WIRELESS COMMUNICATION SYSTEM

(75) Inventors: Sang-Heon Kim, Suwon-si (KR); David Mazzarese, Suwon-si (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 12/978,986

(22) Filed: Dec. 27, 2010

(65) Prior Publication Data

US 2011/0158192 A1 Jun. 30, 2011

(30) Foreign Application Priority Data

Dec. 30, 2009 (KR) .................. 10-2009-0133733
Jan. 9, 2010 (KR) .................. 10-2010-0002049

(51) Int. Cl.
*H04W 72/04* (2009.01)
*H04L 5/00* (2006.01)

(52) U.S. Cl.
CPC ............ *H04L 5/0053* (2013.01); *H04L 5/0023* (2013.01); *H04L 5/0096* (2013.01)

(58) Field of Classification Search
CPC ... H04L 5/0053; H04L 27/206; H04L 1/0007; H04L 47/36; H04L 29/0653; H04L 2012/5652; H04L 5/0007; H04W 80/04; H04W 84/12; H04W 88/06; H04W 88/08; H04W 84/18; H04W 72/04; H04W 76/00; H04W 74/08; H04J 3/07; H04J 3/073; H04J 3/076; H04J 11/00
USPC .......... 370/203, 328, 329, 252, 338; 455/507, 455/509
See application file for complete search history.

(56) References Cited

U.S. PATENT DOCUMENTS

2008/0069031 A1* 3/2008 Zhang et al. .................. 370/328
2008/0119213 A1* 5/2008 Ihm et al. ...................... 455/507

(Continued)

FOREIGN PATENT DOCUMENTS

CN 1961555 A 5/2007
CN 1973457 A 5/2007

(Continued)

OTHER PUBLICATIONS

Hongmei Sun et al, Proposed Text for Feedback Allocation A-MAP Information Elements and FBCH contents for UL Control in the 802.16m AWD; C80216m-09_0986r3, IEEE Draft; C80216m-09_0986r3, IEEE-SA, May 5, 2009, pp. 1-12, XP017726350, tables 1, 2, sections 15.3.6.4.2.2, 15.3.6.4.2.9, vol. 802.16m, No. r3, Piscataway, NJ, USA.

(Continued)

*Primary Examiner* — Kwang B Yao
*Assistant Examiner* — Syed M Bokhari
(74) *Attorney, Agent, or Firm* — Jefferson IP Law, LLP

(57) ABSTRACT

An apparatus and method for efficiently operating a fast feedback channel in a wireless communication system are provided. A method for operating a feedback channel in a Base Station (BS) of a wireless communication system includes identifying feedback information types of one or more feedback channels intended to be deallocated among a plurality of existing allocated feedback channels for a Mobile Station (MS), activating a bit corresponding to the identified feedback information type in a 'deallocation bitmap' field within a DownLink (DL) control signal, and transmitting the DL control signal to the MS. Among the feedback information types of the plurality of existing allocated feedback channels, the feedback information type having the smallest value corresponds to the highest priority bit among bits within the 'deallocation bitmap' field.

20 Claims, 10 Drawing Sheets

(56) References Cited

U.S. PATENT DOCUMENTS

| | | | |
|---|---|---|---|
| 2009/0060010 A1* | 3/2009 | Maheshwari et al. | 375/211 |
| 2009/0075667 A1 | 3/2009 | Bourlas | |
| 2009/0154412 A1* | 6/2009 | Wang | H04W 72/0406 370/329 |
| 2009/0257395 A1 | 10/2009 | Jin et al. | |
| 2010/0202372 A1* | 8/2010 | Chun et al. | 370/329 |
| 2010/0272042 A1* | 10/2010 | Chun et al. | 370/329 |
| 2010/0272047 A1* | 10/2010 | Zhu et al. | 370/329 |
| 2011/0098071 A1* | 4/2011 | Lee et al. | 455/509 |
| 2011/0103218 A1* | 5/2011 | Lee et al. | 370/203 |
| 2012/0213179 A1* | 8/2012 | Bourlas | 370/329 |

FOREIGN PATENT DOCUMENTS

| | | |
|---|---|---|
| EP | 1613117 A2 | 1/2006 |
| JP | 2011-517385 A | 6/2011 |
| JP | 2011-517524 A | 6/2011 |
| WO | 2005/120002 A1 | 12/2005 |

OTHER PUBLICATIONS

Alexander Maltsev et al, Enhanced DL MIMO Feedback on Relay Links, C80216m-09_2512, IEEE Draft; C80216m-09 2512, IEEE-SA, Nov. 6, 2009, pp. 1-12, XP017798965, tables 700, 821, sections 15.2.3.33, 15.3.6.5.2.14, vol. 802.16m, Piscataway, NJ, USA.

* cited by examiner

APPARATUS AND METHOD FOR EFFICIENTLY OPERATING FAST FEEDBACK CHANNEL IN WIRELESS COMMUNICATION SYSTEM

PRIORITY

This application claims the benefit under 35 U.S.C. §119 (a) of a Korean patent application filed in the Korean Intellectual Property Office on Dec. 30, 2009 and assigned Serial No. 10-2009-0133733 and of a Korean patent application filed in the Korean Intellectual Property Office on Jan. 9, 2010 and assigned Serial No. 10-2010-0002049, the entire disclosures of both of which are hereby incorporated by reference.

BACKGROUND OF THE INVENTION

1. Field of the Invention

The present invention relates to an apparatus and method for efficiently operating a fast feedback channel in a wireless communication system. More particularly, the present invention relates to an apparatus and method for efficiently allocating and deallocating a fast feedback channel in a case of operating a plurality of fast feedback channels per Mobile Station (MS) in a wireless communication system based on an Orthogonal Frequency Division Multiple Access (OFDMA) scheme.

2. Description of the Related Art

In the 4th Generation (4G) communication system, which is the next generation communication system, research is being conducted to provide users with services of various Quality of Service (QoS) at a data rate of about 100 Mbps. In particular, a study of the 4G communication system is being made to support high-speed services in considering the guarantee of mobility and QoS for a Broadband Wireless Access (BWA) communication system such as a Wireless Local Area Network (WLAN) system and a Wireless Metropolitan Area Network (WMAN) system. A typical 4G communication system is an Institute of Electrical and Electronics Engineers (IEEE) 802.16 system. The IEEE 802.16 system is a communication system applying an Orthogonal Frequency Division Multiplexing/OFDMA (OFDM/OFDMA) scheme to support a broadband transmission network in a physical channel.

The typical IEEE 802.16m wireless communication system based on the OFDMA scheme uses a control signal of a Feedback Allocation Advanced-MAP Information Element (Feedback Allocation A-MAP IE) in order to command the allocation and deallocation of a fast feedback channel for a Mobile Station (MS). Presently, the Feedback Allocation A-MAP IE may manage one fast feedback channel. In case of allocating a new fast feedback channel, a Base Station (BS) forwards a feedback period, an allocation duration, a physical position of the fast feedback channel, the kind of feedback information to transmit through the fast feedback channel, etc. through a Feedback Allocation A-MAP IE. Here, the kind of the feedback information is determined through a 'Multiple Input Multiple Output (MIMO) Feedback Mode (MFM)' field.

The deallocation of an existing allocated fast feedback channel may be achieved through two schemes. The first scheme is a scheme in which an 'allocation duration' field is set to a specific duration within a Feedback Allocation A-MAP IE at the time of allocating a fast feedback channel and, when the allocation duration is ended, the fast feedback channel is automatically deallocated. The second scheme is a scheme in which a fast feedback channel is forcibly deallocated by a BS. This is achieved by newly transmitting and receiving a Feedback Allocation A-MAP IE whose 'allocation duration' field is set to '0b000'.

The standard of the present D3 criterion has a structure in which an existing allocated fast feedback channel is automatically deallocated when a new fast feedback channel is allocated through a Feedback Allocation A-MAP IE. That is, the D3 criterion standard has a limitation in which only one fast feedback channel per MS exists. If this limitation disappears so that a plurality of fast feedback channels may be operated, a process of deallocation of a fast feedback channel, allocation of a new fast feedback channel, and the like, becomes inefficient. That is, if a plurality of fast feedback channels previously allocated to an MS exist and a BS intends to deallocate some or all of the fast feedback channels, the BS should transmit as many Feedback Allocation A-MAP IEs as the number of the fast feedback channels intended to be deallocated, to inform of the deallocation on a per channel basis. Also, if the BS intends to allocate a new fast feedback channel, the BS should once again transmit a Feedback Allocation A-MAP IE informing of the new allocation.

Thus, there is a need to propose a scheme of efficiently allocating and deallocating a fast feedback channel in a case in which a plurality of fast feedback channels per MS are operated in a wireless communication system based on an OFDMA scheme.

SUMMARY OF THE INVENTION

An aspect of the present invention is to address at least the above-mentioned problems and/or disadvantages and to provide at least the advantages below. Accordingly, an aspect of the present invention is to provide an apparatus and method for efficiently operating a fast feedback channel in a wireless communication system.

Another aspect of the present invention is to provide an apparatus and method for, in case of operating a plurality of fast feedback channels per Mobile Station (MS), efficiently allocating and deallocating the fast feedback channel in a wireless communication system based on an Orthogonal Frequency Division Multiple Access (OFDMA) scheme.

A further aspect of the present invention is to provide an apparatus and method for, in case of operating a plurality of UpLink (UL) fast feedback channels per MS, allocating a new fast feedback channel using one DownLink (DL) control signal and simultaneously selectively deallocating a plurality of existing allocated fast feedback channels in a wireless communication system based on an OFDMA scheme.

Yet another aspect of the present invention is to provide an apparatus and method for, in case of operating a plurality of UL fast feedback channels per MS, commanding the deallocation of a desired one of a plurality of existing allocated fast feedback channels for an MS, by including information on an existing allocated fast feedback channel required to be deallocated within a DL control signal in a bitmap form in a wireless communication system based on an OFDMA scheme.

Still another aspect of the present invention is to provide an apparatus and method for, in case of operating a plurality of UL fast feedback channels per MS, distinguishing the UL fast feedback channels, by connecting a Multiple Input Multiple Output (MIMO) Feedback Mode (MFM) order of an existing allocated fast feedback channel with a position within a bitmap using an 'MFM' field within a Feedback Allocation A-MAP IE in a wireless communication system based on an OFDMA scheme.

Still another aspect of the present invention is to provide an apparatus and method for, in case of operating a plurality of UL fast feedback channels per MS, distinguishing the UL fast feedback channels, by connecting an MFM order of an existing allocated fast feedback channel with a position within a bitmap using an MFM field within a Feedback Polling A-MAP IE in a wireless communication system based on an OFDMA scheme.

The above aspects are achieved by providing an apparatus and method for efficiently operating a fast feedback channel in a wireless communication system.

According to an aspect of the present invention, a method for operating a feedback channel in a Base Station (BS) of a wireless communication system is provided. The method includes identifying feedback information types of one or more feedback channels intended to be deallocated among a plurality of existing allocated feedback channels for an MS, activating a bit corresponding to the identified feedback information type in a 'deallocation bitmap' field within a DL control signal, and transmitting the DL control signal to the MS. Among the feedback information types of the plurality of existing allocated feedback channels, the feedback information type having the smallest value corresponds to the highest priority bit among bits within the 'deallocation bitmap' field.

According to another aspect of the present invention, a method for operating a feedback channel in an MS of a wireless communication system is provided. The method includes, when a DL control signal is received from a BS, identifying a bit activated in a 'deallocation bitmap' field within the DL control signal, identifying one or more feedback channels required to be deallocated using a feedback information type corresponding to the identified bit, and deallocating the identified one or more feedback channels among a plurality of existing allocated feedback channels. Among feedback information types of the plurality of existing allocated feedback channels, a feedback information type having the smallest value corresponds to the highest priority bit among bits within the 'deallocation bitmap' field.

According to a further aspect of the present invention, an apparatus of a BS for operating a feedback channel in a wireless communication system is provided. The apparatus includes a DL control signal generator and a transmitter. The DL control signal generator identifies feedback information types of one or more feedback channels intended to be deallocated among a plurality of existing allocated feedback channels for an MS, and activates a bit corresponding to the identified feedback information type in a 'deallocation bitmap' field within a DL control signal. The transmitter transmits the DL control signal to the MS. Among the feedback information types of the plurality of existing allocated feedback channels, a feedback information type having the smallest value corresponds to the highest priority bit among bits within the 'deallocation bitmap' field.

According to a yet another aspect of the present invention, an apparatus of an MS for operating a feedback channel in a wireless communication system is provided. The apparatus includes a receiver and a DL control signal processor. The receiver receives a DL control signal from a BS. The DL control signal processor identifies a bit activated in a 'deallocation bitmap' field within the DL control signal, identifies one or more feedback channels required to be deallocated using a feedback information type corresponding to the identified bit, and deallocates the identified one or more feedback channels among a plurality of existing allocated feedback channels. Among feedback information types of the plurality of existing allocated feedback channels, a feedback information type having the smallest value corresponds to the highest priority bit among bits within the 'deallocation bitmap' field.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
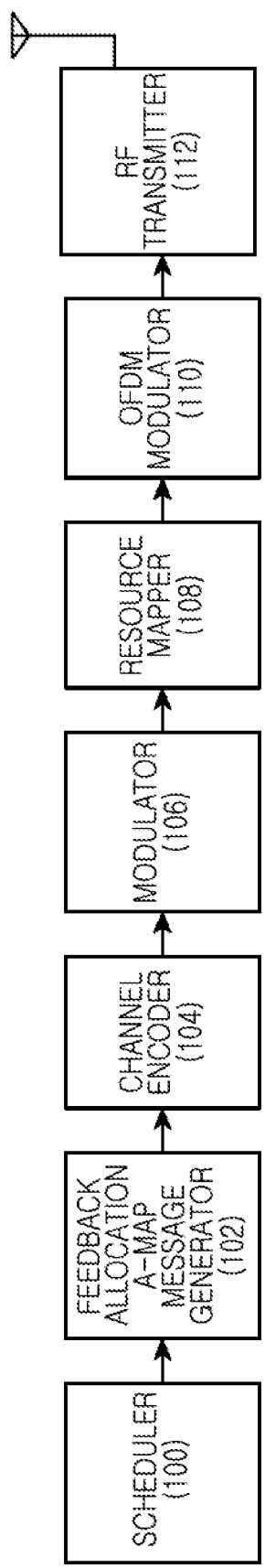
FIG. 1 is a block diagram illustrating a construction of a Base Station (BS) apparatus in a wireless communication system based on an Orthogonal Frequency Division Multiple Access (OFDMA) scheme according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of present invention as described below propose a scheme for, in case of operating a plurality of fast feedback channels per Mobile Station (MS), efficiently allocating and deallocating a fast feedback channel in a wireless communication system based on an Orthogonal Frequency Division Multiple Access (OFDMA) scheme. Here, a description is made with reference to an Institute of Electrical and Electronics Engineers (IEEE) 802.16m wireless communication system. However, it is to be understood that this is by way of example only and that the invention is undoubtedly applicable to all systems operating a plurality of fast feedback channels per MS.

More particularly, exemplary embodiments of the present invention propose a method for including information on an existing allocated fast feedback channel required to be deallocated within a Feedback Allocation Advanced-MAP Information Element (Feedback Allocation A-MAP IE) in a bitmap form for the sake of efficiently allocating and deallocating a fast feedback channel. Because the current fast feedback channel allocation scheme does not have a proper index indicating each allocation, there is a need to consider additional index allocation, etc. to inform the allocation. To address this problem, exemplary embodiments of the present invention propose the use of a 'Multiple Input Multiple Output (MIMO) Feedback Mode (MFM)' field having been already used for fast feedback channel allocation. Because fast feedback channels allocated to MSs will have each different MFM, the use of the 'MFM' field may make it possible to distinguish the fast feedback channels. Regarding a plurality of fast feedback channels having the same MFM, exemplary embodiments of the present invention assume that the plurality of fast feedback channels having the same MFM are simultaneously deallocated. The use of connectivity between an MFM and a fast feedback channel distinction provides an advantage in that there is no need to consider an additional index allocation for fast feedback channel distinction, etc.

In the current IEEE 802.16m wireless communication system, eight MFMs exist, so a bitmap of 8 bits may be used. If the number of assignable fast feedback channels per MS is limited to eight or less, a bitmap having a size of the number of the maximum allowable channels may be used instead. In this case, there may be connectivity between an order of an MFM of a currently allocated fast feedback channel and a position within the bitmap. For example, in case that the number of the maximum allowable channels is equal to '3' and an MS is currently sequentially allocated and operates three fast feedback channels for an MFM0, an MFM3, and an MFM5, a bitmap informing of deallocation may have a length of 3 bits. In the bitmap, a first bit may represent the fast feedback channel for the MFM0, a second bit may represent the fast feedback channel for the MFM3, and the last third bit may represent the fast feedback channel for the MFM5. In this case, if a BS desires to deallocate the fast feedback channel for the MFM3 and maintain the remaining channels, the BS may command the deallocation for an MS by setting the bitmap to '0b010'. Here, the connectivity between the MFM order of the fast feedback channel and the position within the bitmap may be reverse order. Also, a different connectivity method may be considered. If a proper index for a fast feedback channel is allowed, connectivity between an index and a bitmap may also be applied in substantially the same method.

As above, exemplary embodiments of the present invention may command the deallocation of a desired one of a plurality of existing allocated fast feedback channels for an MS, by including information on the existing allocated fast feedback channel required to be deallocated within a Feedback Allocation A-MAP IE in a bitmap form. In an exemplary embodiment, a Feedback Allocation A-MAP IE for this may be configured having a format as shown in Table 1 below. Table 1 below is an example capable of deallocating eight fast feedback channels.

TABLE 1

| Syntax | Size in bits | Description/Notes |
|---|---|---|
| Feedback-Allocation-A-MAP_IE(){ | — | — |
| A-MAP IE Type | 4 | Feedback Allocation A-MAP IE = 0b0010. |
| Channel Index | 6 [10] | Feedback channel index within the UL fast feedback control resource region. |
| Short-term Feedback Period (p) | 3 [13] | A feedback is transmitted on the FBCH every $2^p$ frames. |
| Long-term Feedback Period (q) | 2 [15] | A long-term feedback is transmitted on the FBCH every $2^q$ short-term feedback opportunity. If q = 0b00, long-term feedback is not used. |
| Frame offset | 3 [18] | The AMS starts reporting at the frame number having the same 3 LSBs as the specified frame offset. If the current frame is specified, the AMS starts reporting in eight frames. |

TABLE 1-continued

| Syntax | Size in bits | Description/Notes |
|---|---|---|
| Subframe index | 3 [21] | Indicates the UL subframe index in the UL portion of the frame. |
| Allocation Duration(d) | 3 [24] | An FBCH is transmitted on the FBCH channels indexed by Channel Index for $8 \times 2^d$ frames. If d = 0b000, the FBCH is deallocated. If d = 0b111, the AMS should (shall) report until the ABS commands for the AMS to stop. |
| ACK Allocation Flag | 1 [25] | Indicates if one ACK channel is allocated to acknowledge the successful detection of this IE. |
| If (ACK Allocation Flag == 0b1){ | | |
| HFA | 3 [28] | HARQ feedback channel allocation for Feedback Channel De-allocation confirmation. |
| } | | |
| if (d = 0b000){ | | |
| MFM_deallocation_bitmap | 8 [36] | |
| } else if (d != 0b000){ | | |
| MFM | 3 [31] | MIMO Feedback Mode. |
| MaxMt | Variable 1-2 [33] | Variable number of bits - depends on number of transmit antenna Nt.<br>If Nt = 2 (Any MFM):<br>0b0: 1<br>0b1: 2<br>If Nt = 4 (Any MFM):<br>0b00: 1<br>0b01: 2<br>0b10: 3<br>0b11: 4<br>If Nt = 8 (SU-MIMO MFM 0, 1, 2, 3, 4):<br>0b00: 1<br>0b01: 2<br>0b10: 4<br>0b11: 8<br>If Nt = 8 (MU-MIMO MFM 5, 6, 7):<br>0b00: 1<br>0b01: 2<br>0b10: 3<br>0b11: 4 |
| If (MFM = 2, 3, 5, 6) { | | |
| Feedback Format | 2 [35] | |
| } | | |
| If (MFM=0,1,4,7){ | | |
| FPI | 2 [35] | Frequency partition indication: ABS indicates AMS to send wideband CQI and STC rate of the frequency partition and reuse factor in the future:<br>0b00: Frequency partition index 0<br>0b01: Frequency partition index 1<br>0b10: Frequency partition index 2<br>0b11: Frequency partition index 3 |
| } | | |
| If (MFM == 0,1 AND q!=0b00) { | | |
| Long term FPI | 2 [37] | Frequency partition indication: ABS indicates AMS to send wideband CQI and STC rate for the second frequency partition using long term feedback:<br>0b00: Frequency partition index 0<br>0b01: Frequency partition index 1<br>0b10: Frequency partition index 2<br>0b11: Frequency partition index 3 |
| } | | |
| If (MFM == 3,4,6,7) { | | CL SU and MU MIMO. |
| CM | 2 [37] | Codebook Feedback Mode and Codebook Coordination Enable:<br>0b00: base mode with CCE disabled<br>0b01: transformation mode with CCE disabled<br>0b10: differential mode with CCE disabled<br>0b11: base mode with CCE enabled |
| CS | 1 [38] | Codebook subset if Nt = 4, otherwise CS shall be ignored:<br>0b0: report PMI from the base codebook or transformed base codebook |

TABLE 1-continued

| Syntax | Size in bits | Description/Notes |
|---|---|---|
| | | 0b1: report PMI from the codebook subset or transformed codebook subset |
| } | | |
| If (MFM==0, 1, 2, 5){ | | |
| Measurement Method Indication | 1 [39] | 0b0: Use the midamble for CQI measurements |
| | | 0b1: Use pilots in OL region with MaxMt streams for CQI measurements |
| } | | |
| } | | |
| } | | |
| Padding | Variable | Padding to reach byte boundary. |
| } | | |

In Table 1, the 'A-MAP IE Type' field within the Feedback Allocation A-MAP IE represents the type of an A-MAP IE. Exemplary embodiments of the present invention set the 'A-MAP IE Type' field to '0b0010' to indicate the Feedback Allocation A-MAP IE. The 'Channel Index' field represents an index for resources to be used during an UpLink (UL) control signal duration. The 'Short-term Feedback Period (p)' field represents period information for transmitting a short-term feedback. In an exemplary implementation, the short-term feedback is transmitted every 2p frames. The 'Long-term Feedback Period (q)' field represents period information for transmitting a long-term feedback. In an exemplary implementation, the long-term feedback is transmitted every 2q short-term feedback transmission intervals. The 'frame offset' field represents offset information regarding the starting of transmission of a fast feedback after reception of the Feedback Allocation A-MAP IE. The 'Subframe index' field represents subframe information occupied by a fast feedback channel within a frame. The 'Allocation Duration (d)' field represents duration information for transmitting a fast feedback. In an exemplary implementation, the fast feedback is continuously transmitted during an 8×2d frame duration. If d=0b000, this indicates the deallocation of the fast feedback channel and, if d=0b111, this indicates the maintaining of the allocation of the fast feedback channel until a BS transmits a deallocation command. The 'ACK Allocation Flag' field represents the use or non-use of a Hybrid Automatic Repeat reQuest (HARQ) feedback channel in case of deallocation of the fast feedback channel. The 'HFA' field indicates a HARQ feedback channel allocated in case that the 'ACK Allocation Flag' field is activated. The 'MFM_deallocation_bitmap' field indicates an MFM corresponding to an existing allocated fast feedback channel to deallocate. The 'MFM' field represents a MIMO feedback mode. The 'MaxMt' field indicates the maximum Space-Time Code (STC) rate at which an MS may feed back in Single User (SU)-MIMO, and the number of the maximum users sharing the same resources in Multi-User (MU)-MIMO. The 'Feedback Format' field indicates a detailed feedback form in MFM 2, 3, 5, 6. The 'FPI' field represents frequency partition information in which a short-term fast feedback channel will have to measure and transmit a wideband Channel Quality Indicator (CQI). The 'Long term FPI' field represents frequency partition information in which a long-term fast feedback channel will have to measure and transmit a wideband CQI. The 'CM' field represents a codebook mode that an MS has to transmit. The 'CS' field represents the kind of a codebook that an MS has to transmit. The 'Measurement Method Indication' field represents a signal for which an MS has to measure a CQI.

In case of using the Feedback Allocation A-MAP IE of Table 1, the BS may set the 'Allocation Duration (d)' field to '0b000' and additionally set the 'MFM_deallocation_bitmap' field to command the deallocation of an existing allocated fast feedback channel. By the above setting, the BS may simultaneously control a plurality of fast feedback channels. Also, in case of using the Feedback Allocation A-MAP IE of Table 1, the BS may set the 'Allocation Duration (d)' field to a value other than '0b000' and additionally set a channel allocation related field, to indicate allocation of a new fast feedback channel. In case of using the Feedback Allocation A-MAP IE of Table 1 as above, the BS may control either allocation of a new fast feedback channel or deallocation of a plurality of existing allocated fast feedback channels. Accordingly, in order to allocate a new fast feedback channel and simultaneously deallocate a plurality of existing allocated fast feedback channels, there is a need for transmission of the minimum two Feedback Allocation A-MAP IEs.

In another exemplary embodiment, a BS may configure a Feedback Allocation A-MAP IE such that the BS may control the entire allocation of a new fast feedback channel and simultaneous deallocation of a plurality of existing allocated fast feedback channels through transmission of one Feedback Allocation A-MAP IE. In this case, the Feedback Allocation A-MAP IE may be configured having a format as shown in Table 2 below. Table 2 below is an example capable of deallocating a fast feedback channel in case that two fast feedback channels per MS are allowed. Accordingly, a size of an MFM deallocation bitmap becomes 2 bits.

TABLE 2

| Syntax | Size in bits | Description/Notes |
|---|---|---|
| Feedback-Allocation-A-MAP_IE( ) { | — | — |
| A-MAP IE Type | 4 | Feedback Allocation A-MAP IE = 0b0010. |
| Channel Index | 6 [10] | Feedback channel index within the UL fast feedback control resource region. |
| Short-term Feedback Period (p) | 3 [13] | A feedback is transmitted on the FBCH every $2^p$ frames. |

TABLE 2-continued

| Syntax | Size in bits | Description/Notes |
| --- | --- | --- |
| Long-term Feedback Period (q) | 2 [15] | A long-term feedback is transmitted on the FBCH every $2^q$ short-term feedback opportunity.<br>If q = 0b00, long-term feedback is not used. |
| Frame offset | 3 [18] | The AMS starts reporting at the frame number having the same 3 LSBs as the specified frame offset. If the current frame is specified, the AMS starts reporting in eight frames. |
| Subframe index | 3 [21] | Indicates the UL subframe index in the UL portion of the frame. |
| Allocation Duration(d) | 3 [24] | An FBCH is transmitted on the FBCH channels indexed by Channel Index for $8 \times 2^d$ frames. If d = 0b000, the FBCH is deallocated. If d = 0b111, the AMS should (shall) report until the ABS commands for the AMS to stop. |
| ACK Allocation Flag | 1 [25] | Indicates if one ACK channel is allocated to acknowledge the successful detection of this IE. |
| If (ACK Allocation Flag == 0b1){ | | |
| HFA | 3 [28] | HARQ feedback channel allocation for Feedback Channel De-allocation confirmation. |
| } | | |
| MFM_deallocation_bitmap | 2 [30] | |
| MFM | 3 [33] | MIMO Feedback Mode. |
| MaxMt | Variable 1-2 [35] | Variable number of bits - depends on number of transmit antenna Nt.<br>If Nt = 2 (Any MFM):<br>0b0: 1<br>0b1: 2<br>If Nt = 4 (Any MFM):<br>0b00: 1<br>0b01: 2<br>0b10: 3<br>0b11: 4<br>If Nt = 8 (SU-MIMO MFM 0, 1, 2, 3, 4):<br>0b00: 1<br>0b01: 2<br>0b10: 4<br>0b11: 8<br>If Nt = 8 (MU-MIMO MFM 5, 6, 7):<br>0b00: 1<br>0b01: 2<br>0b10: 3<br>0b11: 4 |
| If (MFM = 2, 3, 5, 6) { | | |
| Feedback Format | 2 [37] | |
| }<br>If(MFM=0,1,4,7){ | | |
| FPI | 2 [37] | Frequency partition indication: ABS indicates AMS to send wideband CQI and STC rate of the frequency partition and reuse factor in the future:<br>0b00: Frequency partition index 0<br>0b01: Frequency partition index 1<br>0b10: Frequency partition index 2<br>0b11: Frequency partition index 3 |
| }<br>If (MFM == 0,1 AND q!=0b00)<br>{ | | |
| Long term FPI | 2 [39] | Frequency partition indication: ABS indicates AMS to send wideband CQI and STC rate for the second frequency partition using long term feedback:<br>0b00: Frequency partition index 0<br>0b01: Frequency partition index 1<br>0b10: Frequency partition index 2<br>0b11: Frequency partition index 3 |
| }<br>If (MFM == 3,4,6,7) { | | CL SU and MU MIMO. |
| CM | 2 [39] | Codebook Feedback Mode and Codebook Coordination Enable:<br>0b00: base mode with CCE disabled |

TABLE 2-continued

| Syntax | Size in bits | Description/Notes |
|---|---|---|
| | | 0b01: transformation mode with CCE disabled |
| | | 0b10: differential mode with CCE disabled |
| | | 0b11: base mode with CCE enabled |
| CS | 1 [40] | Codebook subset if Nt = 4, otherwise CS shall be ignored: |
| | | 0b0: report PMI from the base codebook or transformed base codebook |
| | | 0b1: report PMI from the codebook subset or transformed codebook subset |
| }<br>If(MFM==0, 1, 2, 5){ | | |
| Measurement Method Indication | 1 [40] | 0b0: Use the midamble for CQI measurements |
| | | 0b1: Use pilots in OL region with MaxMt streams for CQI measurements |
| }<br>Padding<br>} | Variable | Padding to reach byte boundary. |

Items indicated by each field within the Feedback Allocation A-MAP IE of Table 2 are the same as items indicated by each field of Table 1. In Table 2, the 'MFM_deallocation_bitmap' field is always included within the Feedback Allocation A-MAP IE. The use of the Feedback Allocation A-MAP IE of Table 2 may lead to deallocating a channel desired by a BS among previously allocated fast feedback channels using an 'MFM_deallocation_bitmap' field even within a Feedback Allocation A-MAP IE informing of an allocation of a new fast feedback channel.

FIG. 1 is a block diagram illustrating a construction of a BS apparatus in a wireless communication system based on an OFDMA scheme according to an exemplary embodiment of the present invention.

Referring to FIG. 1, a BS includes a scheduler 100, a Feedback Allocation A-MAP message generator 102, a channel encoder 104, a modulator 106, a resource mapper 108, an OFDM modulator 110, and a Radio Frequency (RF) transmitter 112.

The scheduler 100 schedules the deallocation of an existing allocated fast feedback channel and allocation of a new fast feedback channel by MS, and outputs the scheduling result to the Feedback Allocation A-MAP message generator 102.

The Feedback Allocation A-MAP message generator 102 generates a Feedback Allocation A-MAP message using the scheduling result from the scheduler 100, and outputs the generated Feedback Allocation A-MAP message to the channel encoder 104. More particularly, the Feedback Allocation A-MAP message generator 102 commands the deallocation of a desired one of a plurality of existing allocated fast feedback channels for an MS by including information on the existing allocated fast feedback channel required to be deallocated within the Feedback Allocation A-MAP IE in a bitmap form. For this purpose, the Feedback Allocation A-MAP message generator 102 identifies MFMs of one or more fast feedback channels intended to be deallocated, and activates a bit corresponding to the identified MFM in an 'MFM_deallocation_bitmap' field within the Feedback Allocation A-MAP IE.

The channel encoder 104 encodes an information bit stream from the Feedback Allocation A-MAP message generator 102 to generate code symbols, and outputs the generated code symbols to the modulator 106.

The modulator 106 modulates the code symbols from the channel encoder 104 using a modulation scheme, generates modulation symbols, and outputs the generated modulation symbols to the resource mapper 108.

The resource mapper 108 maps data from the modulator 106 to resources and outputs the resource-mapped data to the OFDM modulator 110.

The OFDM modulator 110 OFDM-modulates the resource-mapped data from the resource mapper 108, generates OFDM symbols, and outputs the generated OFDM symbols to the RF transmitter 112. Here, the OFDM modulation is meaning inclusive of Inverse Fast Fourier Transform (IFFT) operation, Cyclic Prefix (CP) insertion, and the like.

The RF transmitter 112 converts a baseband signal from the OFDM modulator 110 into an RF signal and transmits the RF signal through an antenna.

Figure 2:
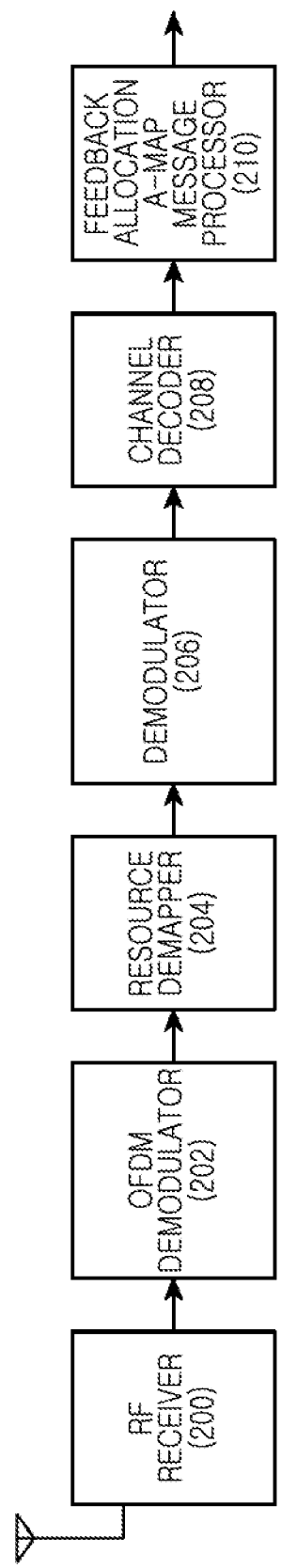
FIG. 2 is a block diagram illustrating a construction of a Mobile Station (MS) apparatus in a wireless communication system based on an OFDMA scheme according to an exemplary embodiment of the present invention.

FIG. 2 is a block diagram illustrating a construction of an MS apparatus in a wireless communication system based on an OFDMA scheme according to an exemplary embodiment of the present invention.

Referring to FIG. 2, an MS includes an RF receiver 200, an OFDM demodulator 202, a resource demapper 204, a demodulator 206, a channel decoder 208, and a Feedback Allocation A-MAP message processor 210.

The RF receiver 200 converts an RF signal received through an antenna into a baseband signal, and outputs the baseband signal to the OFDM demodulator 202.

The OFDM demodulator 202 OFDM-demodulates the baseband signal received from the RF receiver 200 and restores frequency domain signals. Here, the OFDM demodulation is indicates CP removal, a Fast Fourier Transform (FFT) operation, and the like.

The resource demapper 204 resource-demaps the frequency domain signals from the OFDM demodulator 202 and extracts complex symbols.

The demodulator 206 demodulates the complex symbols from the resource demapper 204.

The channel decoder 208 decodes the symbols from the demodulator 206 and restores an information bit stream.

The Feedback Allocation A-MAP message processor 210 processes a Feedback Allocation A-MAP message from the channel decoder 208. More particularly, the Feedback Allocation A-MAP message processor 210 identifies information on an existing allocated fast feedback channel required to be deallocated, included within a Feedback Allocation A-MAP IE in a bitmap form and, accordingly, deallocates the identified fast feedback channel. In more detail, the Feedback Allocation A-MAP message processor 210 identifies a bit activated in an 'MFM_deallocation_bitmap' field within the Feedback Allocation A-MAP IE, identifies an MFM corresponding to the identified bit, determines a fast feedback channel corresponding to the identified MFM as a fast feedback channel to deallocate, and deallocates an existing allocated fast feedback channel required to be deallocated.

Figure 3:
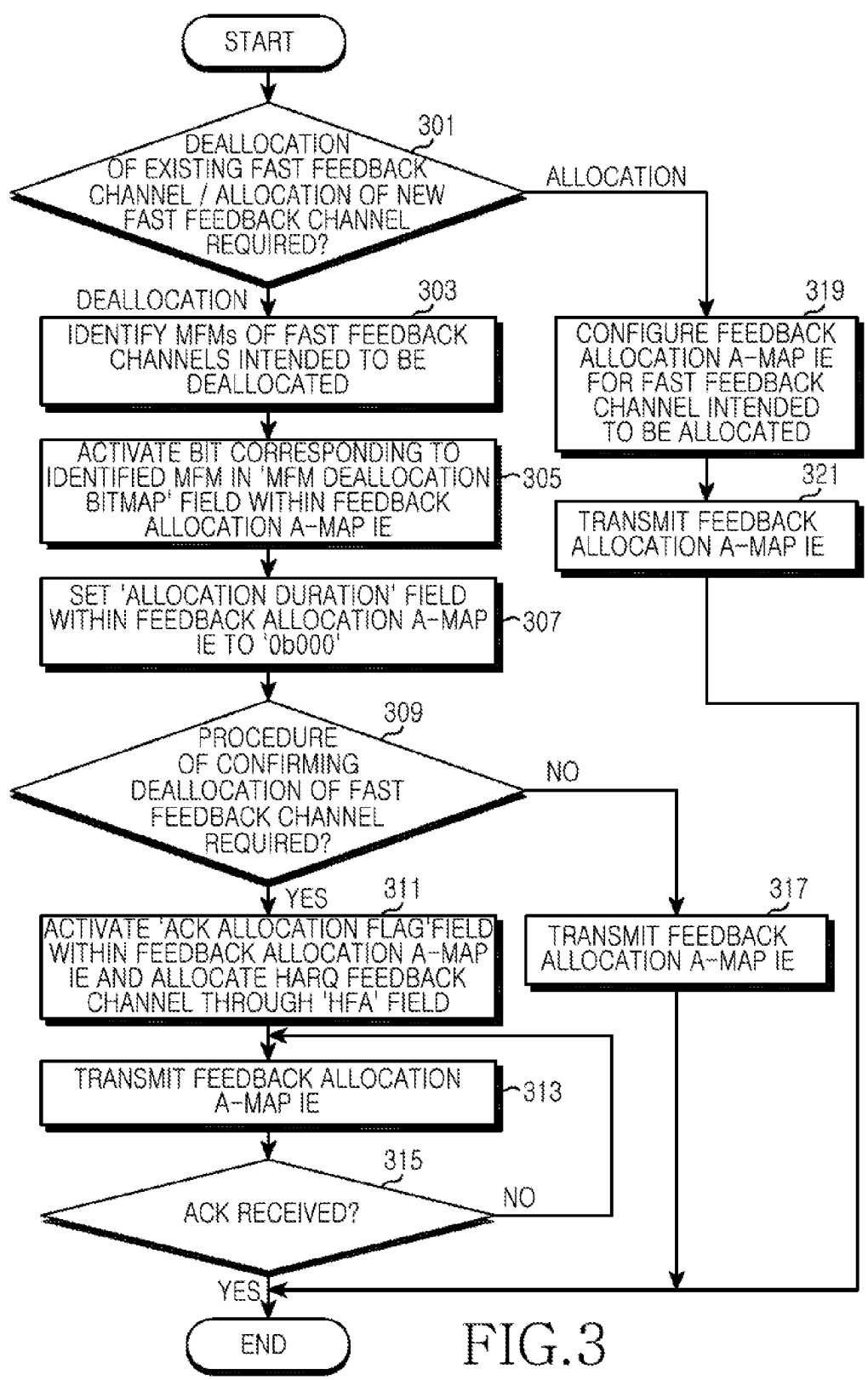
FIG. 3 is a flowchart illustrating a method of a BS for, in case of operating a plurality of fast feedback channels per MS, efficiently allocating and deallocating the fast feedback channel in a wireless communication system based on an OFDMA scheme according to an exemplary embodiment of the present invention.

FIG. 3 is a flowchart illustrating a method of a BS for, in case of operating a plurality of fast feedback channels per MS, efficiently allocating and deallocating the fast feedback channel in a wireless communication system based on an OFDMA scheme according to an exemplary embodiment of the present invention. Here, the exemplary embodiment relates to a method of operating a fast feedback channel using a Feedback Allocation A-MAP IE of Table 1.

Referring to FIG. 3, in step 301, the BS determines which of deallocation of an existing allocated fast feedback channel and allocation of a new fast feedback channel is required for an MS.

If it is determined in step 301 that the deallocation of the existing allocated fast feedback channel is required, the BS identifies MFMs of one or more fast feedback channels intended to be deallocated in step 303.

In step 305, the BS activates a bit corresponding to the identified MFM in an 'MFM_deallocation_bitmap' field within the Feedback Allocation A-MAP IE. By this, the BS may distinguish one or more fast feedback channels desired to be deallocated among existing allocated fast feedback channels.

In step 307, the BS sets an 'Allocation Duration' field within the Feedback Allocation A-MAP IE to '0b000'. By this, the BS may inform an MS that the Feedback Allocation A-MAP IE is a message for deallocation of an existing allocated fast feedback channel.

In step 309, the BS determines if a procedure of confirming the deallocation of a fast feedback channel is required.

If it is determined in step 309 that the procedure of confirming the deallocation of the fast feedback channel is required, the BS activates an 'ACKnowledgement (ACK) Allocation Flag' field within the Feedback Allocation A-MAP IE and allocates a Hybrid Automatic Repeat reQuest (HARQ) feedback channel through a 'HARQ Feedback Allocation (HFA)' field in step 311.

In step 313, the BS transmits the above configured Feedback Allocation A-MAP IE to the MS.

In step 315, the BS determines if an ACK is received through the allocated HARQ feedback channel from the MS.

If it is determined in step 315 that the ACK is received from the MS, the BS terminates the procedure according to the exemplary embodiment of the present invention.

On the other hand, if it is determined in step 315 that the ACK is not received from the MS within a predefined time, the BS returns to step 313 and repeatedly perform the subsequent steps.

On the other hand, if it is determined in step 309 that the procedure of confirming the deallocation of the fast feedback channel is not required, the BS transmits the above configured Feedback Allocation A-MAP IE to the MS in step 317 and then terminates the procedure according to the exemplary embodiment of the present invention.

On the other hand, if it is determined in step 301 that the allocation of the new fast feedback channel is required, the BS performs a general function and configures a Feedback Allocation A-MAP IE for a fast feedback channel intended to be allocated in step 319. Here, the 'Allocation Duration' field within the Feedback Allocation A-MAP IE is set to a value other than '0b000'. In step 321, the BS transmits the above configured Feedback Allocation A-MAP IE to the MS and then terminates the procedure according to the present invention.

Figure 4:
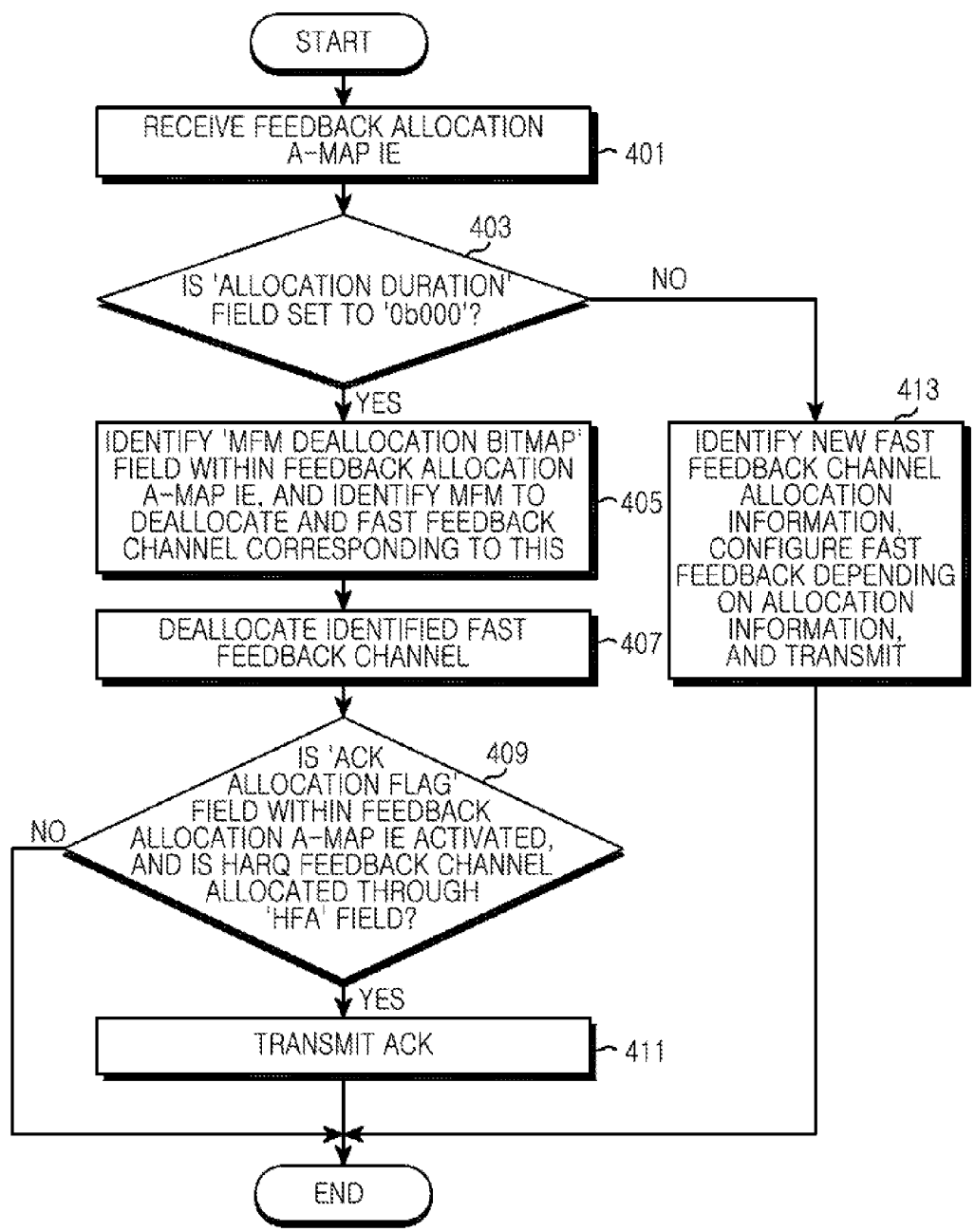
FIG. 4 is a flowchart illustrating a method of an MS for, in case of operating a plurality of fast feedback channels per MS, efficiently allocating and deallocating the fast feedback channel in a wireless communication system based on an OFDMA scheme according to an exemplary embodiment of the present invention.

FIG. 4 is a flowchart illustrating a method of an MS for, in case of operating a plurality of fast feedback channels per MS, efficiently allocating and deallocating the fast feedback channel in a wireless communication system based on an OFDMA scheme according to an exemplary embodiment of the present invention. Here, the exemplary embodiment relates to a method of operating a fast feedback channel using the Feedback Allocation A-MAP IE of Table 1.

Referring to FIG. 4, in step 401, the MS receives a Feedback Allocation A-MAP IE from a BS.

In step 403, the MS identifies an 'Allocation Duration' field within the received Feedback Allocation A-MAP IE and determines if the 'Allocation Duration' field has been set to '0b000'. That is, the BS determines if the received Feedback Allocation A-MAP IE is a message for deallocation of an existing allocated fast feedback channel.

If it is determined in step 403 that the 'Allocation Duration' field within the received Feedback Allocation A-MAP IE has been set to '0b000', the MS identifies an 'MFM_deallocation_bitmap' field within the received Feedback Allocation A-MAP IE and identifies an MFM to deallocate and a fast feedback channel corresponding to the MFM in step 405. In more detail, the MS may identify a bit activated in the 'MFM_deallocation_bitmap' field, identify an MFM corresponding to the identified bit, and determine that a fast feedback channel corresponding to the identified MFM is a fast feedback channel to deallocate.

In step 407, the MS deallocates the identified fast feedback channel.

In step 409, the MS determines if an 'ACK Allocation Flag' field within the Feedback Allocation A-MAP IE has been activated and if a HARQ feedback channel has been allocated through an 'HFA' field.

If it is determined in step 409 that the 'ACK Allocation Flag' field within the Feedback Allocation A-MAP IE has been activated and the HARQ feedback channel has been allocated through the 'HFA' field, the MS proceeds to step 411 and transmits an ACK to a BS through the allocated HARQ feedback channel and then terminates the procedure according to the present invention.

On the other hand, if it is determined in step 409 that the 'ACK Allocation Flag' field within the Feedback Allocation A-MAP IE has not been activated, the MS terminates the procedure according to the exemplary embodiment of the present invention.

On the other hand, if it is determined in step 403 that the 'Allocation Duration' field within the received Feedback Allocation A-MAP IE has not been set to the '0b000', the MS determines that the received Feedback Allocation A-MAP IE is a message for allocation for a new fast feedback channel and, in step 413, performs a general function, identifies allocation information on a new fast feedback channel through the received Feedback Allocation A-MAP IE, configures a fast feedback according to the identified allocation information, and transmits the configured fast feedback to the BS.

After that, the MS terminates the procedure according to the exemplary embodiment of the present invention.

Figure 5:
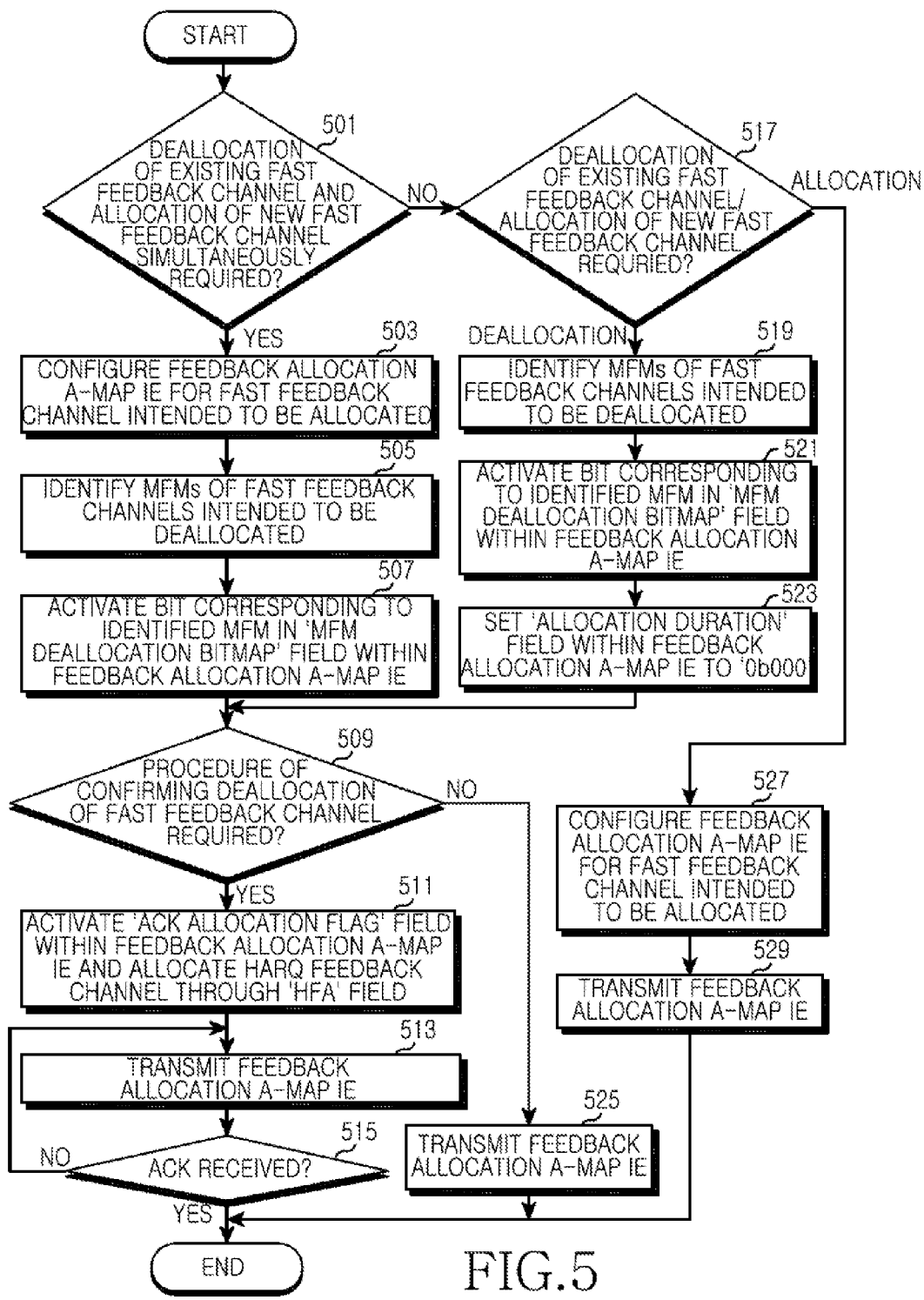
FIG. 5 is a flowchart illustrating a method of a BS for, in case of operating a plurality of fast feedback channels per MS, efficiently allocating and deallocating the fast feedback channel in a wireless communication system based on an OFDMA scheme according to an exemplary embodiment of the present invention.

FIG. 5 is a flowchart illustrating a method of a BS for, in case of operating a plurality of fast feedback channels per MS, efficiently allocating and deallocating the fast feedback channel in a wireless communication system based on an OFDMA scheme according to an exemplary embodiment of the present invention. Here, the exemplary embodiment relates to a method of operating a fast feedback channel using the Feedback Allocation A-MAP IE of Table 2.

Referring to FIG. 5, in step 501, the BS determines if deallocation of an existing allocated fast feedback channel and allocation of a new fast feedback channel are simultaneously required for an MS.

If it is determined in step 501 that the deallocation of the existing allocated fast feedback channel and the allocation of the new fast feedback channel are required, the BS performs a general function and configures a Feedback Allocation A-MAP IE for a fast feedback channel intended to be allocated in step 503. Here, an 'Allocation Duration' field within the Feedback Allocation A-MAP IE is set to a value other than '0b000'.

In step 505, the BS identifies MFMs of one or more fast feedback channels intended to be deallocated.

In step 507, the BS activates a bit corresponding to the identified MFM in an 'MFM_deallocation_bitmap' field within the Feedback Allocation A-MAP IE. By this, the BS may distinguish one or more fast feedback channels desired to be deallocated among existing allocated fast feedback channels.

In step 509, the BS determines if a procedure of confirming the deallocation of a fast feedback channel is required.

If it is determined in step 509 that the procedure of confirming the deallocation of the fast feedback channel is required, the BS activates an 'ACKnowledgement (ACK) Allocation Flag' field within the Feedback Allocation A-MAP IE and allocates a HARQ feedback channel through an 'HFA' field in step 511.

In step 513, the BS transmits the above configured Feedback Allocation A-MAP IE to the MS.

In step 515, the BS determines if an ACK is received through the allocated HARQ feedback channel from the MS.

If it is determined in step 515 that the ACK is received from the MS, the BS terminates the procedure according to the exemplary embodiment of the present invention.

On the other hand, if it is determined in step 515 that the ACK is not received from the MS within a predefined time, the BS returns to step 513 and performs the subsequent steps.

On the other hand, if it is determined in step 509 that the procedure of confirming the deallocation of the fast feedback channel is not required, the BS transmits the above configured Feedback Allocation A-MAP IE to the MS in step 525 and then terminates the procedure according to the exemplary embodiment of the present invention.

On the other hand, if it is determined in step 501 that the deallocation of the existing allocated fast feedback channel and the allocation of the new fast feedback channel are not simultaneously required, the BS determines which one of the deallocation of the existing allocated fast feedback channel and the allocation of the new fast feedback channel is required for the MS in step 517.

If it is determines in step 517 that the deallocation of the existing allocated fast feedback channel is required, the BS identifies MFMs of one or more fast feedback channels intended to be deallocated in step 519.

In step 521, the BS activates a bit corresponding to the identified MFM in an 'MFM_deallocation_bitmap' field within the Feedback Allocation A-MAP IE.

In step 523, the BS sets an 'Allocation Duration' field within the Feedback Allocation A-MAP IE to '0b000' and then proceeds to step 509 and performs the subsequent steps.

On the other hand, if it is determined in step 517 that the allocation of the new fast feedback channel is required, the BS performs a general function and configures a Feedback Allocation A-MAP IE for a fast feedback channel intended to be allocated in step 527. Here, the 'Allocation Duration' field within the Feedback Allocation A-MAP IE is set to a value other than '0b000'. In step 529, the BS transmits the above configured Feedback Allocation A-MAP IE to the MS and then terminates the procedure according to the present invention.

Figure 6:
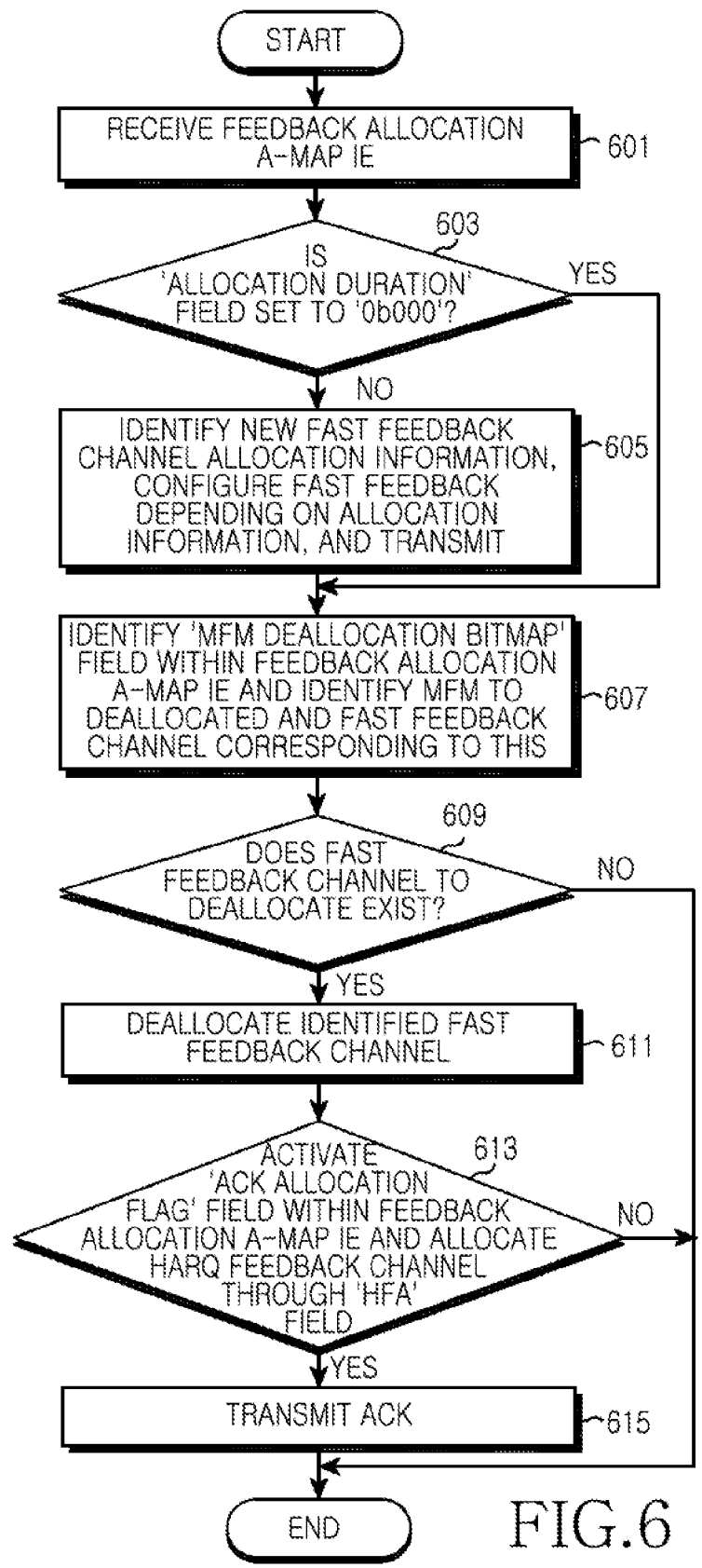
FIG. 6 is a flowchart illustrating a method of an MS for, in case of operating a plurality of fast feedback channels per MS, efficiently allocating and deallocating the fast feedback channel in a wireless communication system based on an OFDMA scheme according to a second exemplary embodiment of the present invention.

FIG. 6 is a flowchart illustrating a method of an MS for, in case of operating a plurality of fast feedback channels per MS, efficiently allocating and deallocating the fast feedback channel in a wireless communication system based on an OFDMA scheme according to an exemplary embodiment of the present invention. Here, the exemplary embodiment relates to a method of operating a fast feedback channel using the Feedback Allocation A-MAP IE of Table 2.

Referring to FIG. 6, in step 601, the MS receives a Feedback Allocation A-MAP IE from a BS.

In step 603, the MS identifies an 'Allocation Duration' field within the received Feedback Allocation A-MAP IE and determines if the 'Allocation Duration' field has been set to '0b000'.

If it is determined in step 603 that the 'Allocation Duration' field within the received Feedback Allocation A-MAP IE has not been set to the '0b000', the MS identifies allocation information on a new fast feedback channel through the received Feedback Allocation A-MAP IE, configures a fast feedback according to the identified allocation information, and transmits the configured fast feedback to the BS in step 605 and then proceeds to step 607.

On the other hand, if it is determined in step 603 that the 'Allocation Duration' field within the received Feedback Allocation A-MAP IE has been set to the '0b000', the MS proceeds directly to step 607.

In step 607, the MS identifies an 'MFM_deallocation_bitmap' field within the received Feedback Allocation A-MAP IE, identifies an MFM to deallocate, and identifies a fast feedback channel corresponding to the identified MFM. In more detail, the MS may identify a bit activated in the 'MFM_deallocation_bitmap' field, identify an MFM corresponding to the identified bit, and determine that a fast feedback channel corresponding to the identified MFM is a fast feedback channel to deallocate.

In step 609, the MS determines if there is a fast feedback channel to deallocate.

If it is determined in step 609 that there is a fast feedback channel to deallocate, the MS deallocates the identified fast feedback channel in step 611.

In step 613, the MS determines if an 'ACK Allocation Flag' field within the Feedback Allocation A-MAP IE has been activated and a HARQ feedback channel has been allocated through an 'HFA' field.

If it is determined in step 613 that the 'ACK Allocation Flag' field within the Feedback Allocation A-MAP IE has been activated and the HARQ feedback channel has been allocated through the 'HFA' field, the MS proceeds to step 615 and transmits an ACK to the BS through the allocated HARQ feedback channel and then terminates the procedure according to the present invention.

On the other hand, if it is determined in step 613 that the 'ACK Allocation Flag' field within the Feedback Allocation A-MAP IE has not been activated, the MS terminates the procedure according to the exemplary embodiment of the present invention.

On the other hand, if it is determined in step 609 that there is not the fast feedback channel to deallocate, the MS terminates the procedure according to the exemplary embodiment of the present invention.

Exemplary embodiments of the present invention are similarly applicable to a MIMO extended header or a Media Access Control (MAC) control message which are feedback channels other than a fast feedback channel. That is, exemplary embodiments of the present invention are applicable to a Feedback Polling A-MAP IE managing the MIMO extended header and MAC control message that are other feedback channels transmitting feedback information. The Feedback Polling A-MAP IE provides a scheme of indicating the kind of feedback contents that an MS has to transmit and simultaneously informing of all of resource allocation related information capable of transmitting this. As a different scheme, there is also a scheme of indicating only the kind of feedback contents through the Feedback Polling A-MAP IE and informing of resource allocation related information capable of transmitting this through a general resource allocation control signal that is a UL Basic Assignment A-MAP IE or UL Subband Assignment A-MAP IE. A plurality of feedback channels may be allocated through a plurality of Feedback Polling A-MAP IEs. Also, it is expected to allocate a plurality of feedback channels by one Feedback Polling A-MAP IE through later change. Regarding a case in which there are a plurality of feedback channels as above, both schemes provide no specific indexing method for several feedback channels. Thus, in this case, exemplary embodiments of the present invention may be applied to deallocate a specific feedback channel desired by a BS. That is, exemplary embodiments of the present invention may deallocate a specific feedback channel by using an MFM of the specific feedback channel.

In the current IEEE 802.16m wireless communication system, eight MFMs exist, so the system may command the deallocation of a feedback channel of a specific MFM by using a polling_deallocation_bitmap of 8 bits. For example, in case that an MS currently operates an MFM0 to an MFM7, if the 'polling_deallocation_bitmap' is '0b10010000', it indicates the deallocation of feedback channels corresponding to the MFM0 and the MFM3. Meanwhile, a Feedback Polling A-MAP IE may allocate a feedback channel transmitting only a correlation matrix other than a feedback channel corresponding to an MFM. In this case, in order to command the deallocation of the feedback channel transmitting only the correlation matrix, a method of defining a 'polling_deallocation-bitmap' within the Feedback Polling A-MAP IE as '0b00000000' may be considered. Or, a method of increasing a size of a 'polling_deallocation-bitmap' to 9 bits and making use of the last bit or a first bit as a deallocation bit of the feedback channel transmitting only the correlation matrix as in Table 3 below may be also considered. Also, a 'polling_deallocation-bitmap' of 10 bits may be considered in order to include up to a case having a feedback channel for a multi-BS MIMO. For example, a first bit to an eighth bit of the 'polling_deallocation-bitmap' may indicate fast feedback channels for an MFM0 to an MFM7, a ninth bit may indicate a feedback channel transmitting only a correlation matrix, and a tenth bit may indicate a multi-BS MIMO feedback channel.

If the number of maximum feedback channels per MS is fixed to a specific number (N), a size of a 'polling deallocation-bitmap' may be 'N' bits. In this case, as in the aforementioned example of the Feedback Allocation A-MAP IE, a rule such as corresponding the lowest MFM to the highest priority bit in a bitmap may be defined. Herein, the highest priority bit may be referred as 'Most Significant Bit (MSB)'. Unlike the Feedback Allocation A-MAP IE, the Feedback Polling A-MAP IE has to consider a case in which a feedback channel transmitting only a correlation matrix exists but, because the number of the maximum feedback channels is limited, there is no need to increase a bitmap size to include the deallocation of the feedback channel transmitting only the correlation matrix. This may be simply solved by, through predefinition of a position representing the deallocation of a feedback channel transmitting only a correlation matrix, connecting an order of an MFM of a currently allocated fast feedback channel and a position within a bitmap. For example, if the number of the maximum allowable channels is equal to '4' and an MS is currently sequentially allocated and operates a total of three fast feedback channels for an MFM0, an MFM2, and a correlation matrix, a bitmap informing of deallocation may have a length of 4 bits. In the bitmap, a first bit may indicate a fast feedback channel for the MFM0, a second bit may indicate a fast feedback channel for the MFM2, and a third bit may indicate a fast feedback channel for the correlation matrix. Here, by activating a bit corresponding to a feedback channel intended to be deallocated, a BS may command the deallocation of a corresponding feedback channel for an MS. For example, if the BS desires to deallocate a fast feedback channel for the MFM0 and the correlation matrix, the BS may command the deallocation by setting a polling deallocation bitmap field to '0b1010'. If the MS is currently allocated and operates a total of four feedback channels for an MFM0, an MFM2, an MFM5, and a correlation matrix in sequence, a first bit of the bitmap may indicate a fast feedback channel for the MFM0, a second bit may indicate a fast feedback channel for the MFM2, a third bit may indicate a fast feedback channel for the MFM5, and the last fourth bit may indicate a fast feedback channel for the correlation matrix. Through the above same method, by activating a bit corresponding to a fast feedback channel intended to be deallocated, a BS may command the deallocation of the fast feedback channel for an MS.

Here, the Feedback Polling A-MAP IE may be configured similar to the format of Table 3 below. Table 3 below is an example capable of commanding the deallocation of a total of nine fast feedback channels for an MFM and a correlation matrix. Here, the polling_deallocation_bitmap has a size of 9 bits. A first bit to an eighth bit indicate fast feedback channels for an MFM0 to an MFM7, and a ninth bit indicates a feedback channel transmitting only a correlation matrix.

TABLE 3

| Syntax | Size in bits | Notes |
|---|---|---|
| A-MAP IE Type { | 4 | Feedback_Polling_IE. |
| Allocation Duration (d) | 3 | The allocation is valid for $2^{(d-1)}$ superframes starting from the superframe defined by allocation relevance. If d == 0b000, the pre-scheduled feedback |

TABLE 3-continued

| Syntax | Size in bits | Notes |
|---|---|---|
| | | header transmission is released. If d == 0b111, the pre-scheduled feedback header transmission shall be valid until the BS commands to release it. |
| Dedicated UL allocation | 1 | 0b0: No dedicated UL resource is allocated. BS shall provide UL allocation for the MIMO feedback IE transmission through UL A-MAP IE at each designated transmitting frame defined by this IE.<br>0b1: Dedicated UL resource is included in this IE |
| If (d ==0b000){<br>If (Dedicated UL allocation ==0b0){<br>Resource Index | 11 | Confirmation of the resource index for a previously assigned persistent resource that has been deallocated.<br>5 MHz: 0 in first 2 MSB bits + 9 bits for resource index<br>10 MHz: 11 bits for resource index<br>20 MHz: 11 bits for resource index<br>Resource index includes location and allocation size. |
| }<br>polling_deallocation_bitmap | 9 | MFMs set to 1 in MFM_deallocation_bitmap are deallocated.<br>Last bit indicates the deallocation of correlation matrix. |
| HFA | 3 | HARQ feedback channel allocation for Feedback Channel De-allocation confirmation. |
| } else if (d != 0b000){<br>If (Dedicated UL allocation ==0b1){ | | |
| $I_{SizeOffset}$ | 5 | Offset used to compute burst size index. |
| Resource Index | 11 | 5 MHz: 0 in first 2 MSB bits + 9 bits for resource index.<br>10 MHz: 11 bits for resource index<br>20 MHz: 11 bits for resource index<br>Resource index includes location and allocation size. |
| MEF | 1 | MIMO encoder format for uplink feedback transmission.<br>Non-adaptive precoding shall be used at the AMS:<br>0b0: SFBC<br>0b1: VE with Mt = 2 if Nt > 1, or VE with Mt = 1 if Nt = 1<br>Nt is the number of transmit antennas at the AMS. |
| }<br>Period (p) | 3 | Transmit feedback every $4^p$ frame.<br>The first report shall start at the next frame. |
| MIMO_feedback_IE_type | 1 | 0b0: feedback for single-BS MIMO operation<br>0b1: feedback for multi-BS MIMO operation |
| If (MIMO_feedback_IE_type == 0b0){<br>Transmit_Correlation_Matrix | 1 | Single-BS MIMO feedback request.<br>0b0: feedback of the transmit correlation matrix is indicated by CM<br>0b1: feedback of the quantized BS transmit correlation matrix only<br>Transmit correlation matrix shall be feedback if CM = 0b1. |
| If (Transmit_Correlation_Matrix == 0b0){<br>MaxM$_t$ | Variable 1 or 2 | ABS requests AMS to feedback CQI and CSI for a specific MFM.<br>Variable number of bits - depends on number of transmit antenna N$_t$ at the ABS.<br>If N$_t$ = 2 (Any MFM):<br>0b0: 1<br>0b1: 2<br>If N$_t$ = 4 (Any MFM):<br>0b00: 1<br>0b01: 2 |

TABLE 3-continued

| Syntax | Size in bits | Notes |
|---|---|---|
| | | 0b10: 3 |
| | | 0b11: 4 |
| | | If $N_t = 8$ (SU-MIMO MFM 0, 1, 2, 3, 4): |
| | | 0b00: 1 |
| | | 0b01: 2 |
| | | 0b10: 4 |
| | | 0b11: 8 |
| | | If $N_t = 8$ (MU-MIMO MFM 5, 6, 7): |
| | | 0b00: 1 |
| | | 0b01: 2 |
| | | 0b10: 3 |
| | | 0b11: 4 |
| MFM | 3 | MIMO Feedback Mode for which the AMS shall transmit feedback. |
| If (MFM = 2, 3, 5, 6) { | | Feedback of CQI and CSI for localized resource units. |
| Num_best_subbands | 2 | 0b00: report all subbands |
| | | 0b01: 1 best subband |
| | | 0b10: min $\{6, Y_{SB}\}$ best subbands |
| | | 0b11: min $\{12, Y_{SB}\}$ best subbands |
| | | $1 <$ Num_best_subbands $\leq Y_{SB}$ |
| } | | |
| If (MFM == 3,4,6,7) { | | Feedback of CQI and CSI for CL SU and MU MIMO. |
| CM | [TBD] | [TBD] |
| CS | 1 | 0b0: report PMI from the base codebook |
| | | 0b1: report PMI from the codebook subset |
| } | | |
| If (MFM=0, 1, 2, 5){ | | Indication of report for OL region. |
| Measurement Method Indication | 1 | 0b0: Use the midamble for CQI measurements |
| | | 0b1: Use pilots in OL region with $MaxM_t$ streams for CQI measurements |
| } | | |
| } | | |
| } | | |
| Else { | | Multi-BS MIMO feedback request. |
| TRU | 2 | Target RU indicating which RUs or which type of RU to work on for feedback. |
| | | 0b00: Latest best subbands reported for single BS MIMO |
| | | 0b01: Whole bandwidth |
| | | 0b10: FFR partition 0 |
| | | 0b11: boosted FFR partition |
| ICT | 2 | 0b00: PMI restriction for single-BS precoding; |
| | | 0b01: PMI recommendation for single-BS precoding; |
| | | 0b10: CL-MD for multi-BS precoding; |
| | | 0b11: Co-MIMO for multi-BS precoding; |
| CS | 1 | 0b0: report PMI from the base codebook |
| | | 0b1: report PMI from the codebook subset |
| N_multiBS_reports | 3 | N_multiBS_reports indicates the number of reports. |
| If (ICT = 0b11) { | | |
| MaxUser | 2 | Maximum number of users supported in Co-MIMO in the same resource. |
| | | 0b00: 2 users |
| | | 0b01: 3 users |
| | | 0b10: 4 users |
| | | 0b11: reserved |
| } | | |
| } | | |
| } | | |
| } | | |
| Padding | variable | Padding to reach byte boundary. |
| } | | |

In Table 3, the 'Allocation duration (d)' field within the Feedback Polling A-MAP IE represents duration information for transmitting a fast feedback channel. A fast feedback is continuously transmitted during a superframe duration. If d=0b000, this indicates the deallocation of the fast feedback channel and, if d=0b111, this indicates maintenance of allocation of the fast feedback channel until a BS transmits a deallocation command. The 'Dedicated UL allocation' field represents allocation/deallocation for dedicated resources. In exemplary embodiments of the present invention, '0b0' is set for the Feedback Polling A-MAP IE to indicate that it is deallocation for existing allocated dedicated resources and, '0b1' is set to indicate that it is allocation for new dedicated resources. The 'Resource Index' field indicates an index for dedicated resources intended to be deallocated. The 'polling_deallocation_bitmap' field indicates an MFM and a correlation matrix corresponding to an existing allocated fast feedback channel intended to be deallocated. The 'HFA' field indicates an allocated HARQ feedback channel. The 'Resource Index' field represents UL resource information for transmitting feedback information. The 'MEF' field represents a MIMO encoding format. The 'Period (p)' field represents period information for transmitting feedback. The feedback is transmitted every 4p frame. The 'MFM' field represents a MIMO feedback mode. The 'MaxMt' field represents the maximum STC rate that an MS may feed back in an SU-MIMO, and the number of the maximum users sharing the same resources in an MU-MIMO. The 'Num_best_subbands' field represents the number of the best subbands to feedback. The 'CM' field represents a codebook mode that an MS has to transmit. The 'CS' field represents the kind of a codebook that an MS has to transmit. The 'Measurement Method Indication' field represents a signal for which an MS will have to measure a CQI.

In addition, as in Table 4 below, a BS may command the deallocation of a feedback channel for multi-BS MIMO to a Feedback Polling A-MAP IE in the same scheme. In case that the BS may allocate to an MS a multi-BS MIMO feedback channel like general single-BS MIMO feedback channels, if the number of the maximum allowable feedback channels is equal to '4' and an MS is sequentially allocated and operates a total of four feedback channels for two MFMs and correlation matrixes, and a multi-BS MIMO, a bitmap informing of deallocation may have a length of 4 bits. Here, in the bitmap, first and second bits may indicate a fast feedback channel for an MFM of a single BS MIMO, a third bit may indicate a fast feedback channel for a correlation matrix, and the last fourth bit may indicate a fast feedback channel for a multi-BS MIMO. By activating a bit corresponding to a feedback channel intended to be deallocated in the same method as the above, a BS may command the deallocation of a corresponding feedback channel for an MS.

TABLE 4

| Syntax | Size in bits | Notes |
| --- | --- | --- |
| A-MAP IE Type { | 4 | Feedback_Polling_IE. |
| Allocation Duration (d) | 3 | The allocation is valid for $2^{(d-1)}$ superframes starting from the superframe defined by allocation relevance. If d == 0b000, the pre-scheduled feedback header transmission is released. If d == 0b111, the pre-scheduled feedback header transmission shall be valid until the BS commands to release it. |
| Dedicated UL allocation | 1 | 0b0: No dedicated UL resource is allocated. BS shall provide UL allocation for the MIMO feedback IE transmission through UL A-MAP IE at each designated transmitting frame defined by this IE. 0b1: Dedicated UL resource is included in this IE |
| If (d ==0b000){ If (Dedicated UL allocation ==0b0){ Resource Index | 11 | Confirmation of the resource index for a previously assigned persistent resource that has been deallocated. 5 MHz: 0 in first 2 MSB bits + 9 bits for resource index 10 MHz: 11 bits for resource index 20 MHz: 11 bits for resource index Resource index includes location and allocation size. |
| } polling_deallocation_bitmap | 4 | For single BS and multi BS MIMO feedback deallocation. Order of bitmap is MFMs, correlation matrix, and multiBS MIMO. |
| HFA | 3 | HARQ feedback channel allocation for Feedback Channel De-allocation confirmation. |
| } else if (d != 0b000){ If (Dedicated UL allocation ==0b1){ $I_{SizeOffset}$ | 5 | Offset used to compute burst size index. |
| Resource Index | 11 | 5 MHz: 0 in first 2 MSB bits + 9 bits for resource index 10 MHz: 11 bits for resource index 20 MHz: 11 bits for resource index |

TABLE 4-continued

| Syntax | Size in bits | Notes |
|---|---|---|
| | | Resource index includes location and allocation size. |
| MEF | 1 | MIMO encoder format for uplink feedback transmission. Non-adaptive precoding shall be used at the AMS. 0b0: SFBC 0b1: VE with Mt = 2 if Nt > 1, or VE with Mt = 1 if Nt = 1 Nt is the number of transmit antennas at the AMS. |
| } | | |
| Period (p) | 3 | Transmit feedback every $4^p$ frame. The first report shall start at the next frame. |
| MIMO_feedback_IE_type | 1 | 0b0: feedback for single-BS MIMO operation 0b1: feedback for multi-BS MIMO operation |
| If (MIMO_feedback_IE_type == 0b0){ | | Single-BS MIMO feedback request. |
| Transmit_Correlation_Matrix | 1 | 0b0: feedback of the transmit correlation matrix is indicated by CM 0b1: feedback of the quantized BS transmit correlation matrix only Transmit correlation matrix shall be feedback if CM = 0b1. |
| If (Transmit_Correlation_Matrix == 0b0){ | | ABS requests AMS to feedback CQI and CSI for a specific MFM. |
| MaxM$_t$ | Variable 1 or 2 | Variable number of bits - depends on number of transmit antenna N$_t$ at the ABS. If N$_t$ = 2 (Any MFM): 0b0: 1 0b1: 2 If N$_t$ = 4 (Any MFM): 0b00: 1 0b01: 2 0b10: 3 0b11: 4 If N$_t$ = 8 (SU-MIMO MFM 0, 1, 2, 3, 4): 0b00: 1 0b01: 2 0b10: 4 0b11: 8 If N$_t$ = 8 (MU-MIMO MFM 5, 6, 7): 0b00: 1 0b01: 2 0b10: 3 0b11: 4 |
| MFM | 3 | MIMO Feedback Mode for which the AMS shall transmit feedback. |
| If (MFM = 2, 3, 5, 6) { | | Feedback of CQI and CSI for localized resource units. |
| Num_best_subbands | 2 | 0b00: report all subbands 0b01: 1 best subband 0b10: min {6, Y$_{SB}$} best subbands 0b11: min {12, Y$_{SB}$} best subbands 1 < Num_best_subbands ≤ Y$_{SB}$ |
| } | | |
| If (MFM == 3,4,6,7) { | | Feedback of CQI and CSI for CL SU and MU MIMO. |
| CM | [TBD] | [TBD] |
| CS | 1 | 0b0: report PMI from the base codebook 0b1: report PMI from the codebook subset |
| } | | |
| If (MFM=0, 1, 2, 5){ | | Indication of report for OL region. |
| Measurement Method Indication | 1 | 0b0: Use the midamble for CQI measurements 0b1: Use pilots in OL region with MaxM$_t$ streams for CQI measurements |
| } | | |
| } | | |
| } | | |

TABLE 4-continued

| Syntax | Size in bits | Notes |
|---|---|---|
| Else {  
TRU | 2 | Multi-BS MIMO feedback request.  
Target RU indicating which RUs or which type of RU to work on for feedback.  
0b00: Latest best subbands reported for single BS MIMO  
0b01: Whole bandwidth  
0b10: FFR partition 0  
0b11: boosted FFR partition |
| ICT | 2 | 0b00: PMI restriction for single-BS precoding;  
0b01: PMI recommendation for single-BS precoding;  
0b10: CL-MD for multi-BS precoding;  
0b11: Co-MIMO for multi-BS precoding; |
| CS | 1 | 0b0: report PMI from the base codebook  
0b1: report PMI from the codebook subset |
| N_multiBS_reports | 3 | N_multiBS_reports indicates the number of reports. |
| If (ICT = 0b11) {  
MaxUser | 2 | Maximum number of users supported in Co-MIMO in the same resource.  
0b00: 2 users  
0b01: 3 users  
0b10: 4 users  
0b11: reserved |
| }  
}  
}  
}  
Padding  
} | variable | Padding to reach byte boundary. |

Figure 7A:
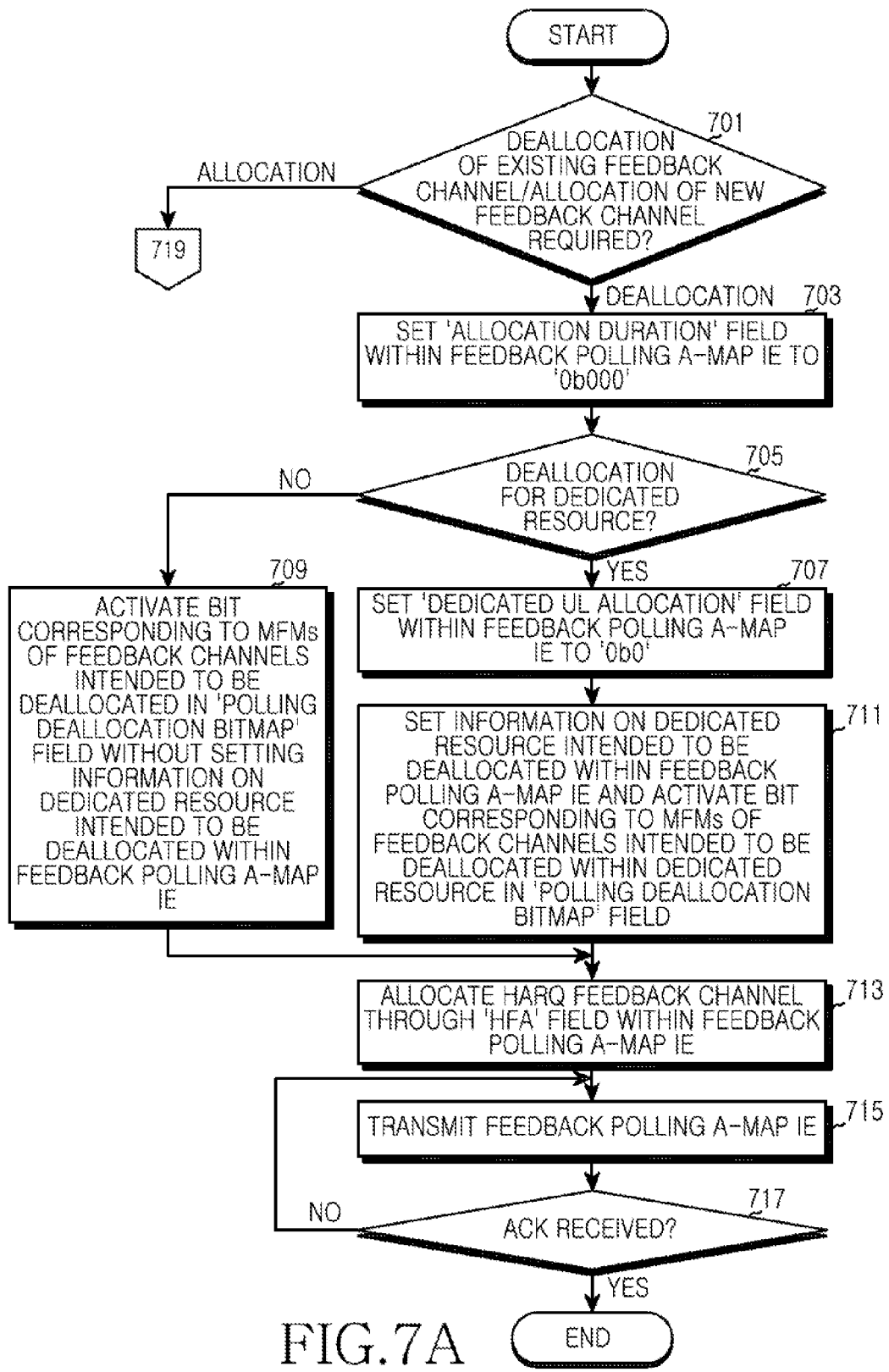
FIGS. 7A and 7B are flowcharts illustrating a method of a BS for, in case of operating a plurality of fast feedback channels per MS, efficiently allocating and deallocating the fast feedback channel in a wireless communication system based on an OFDMA scheme according to an exemplary embodiment of the present invention.
Figure 7B:
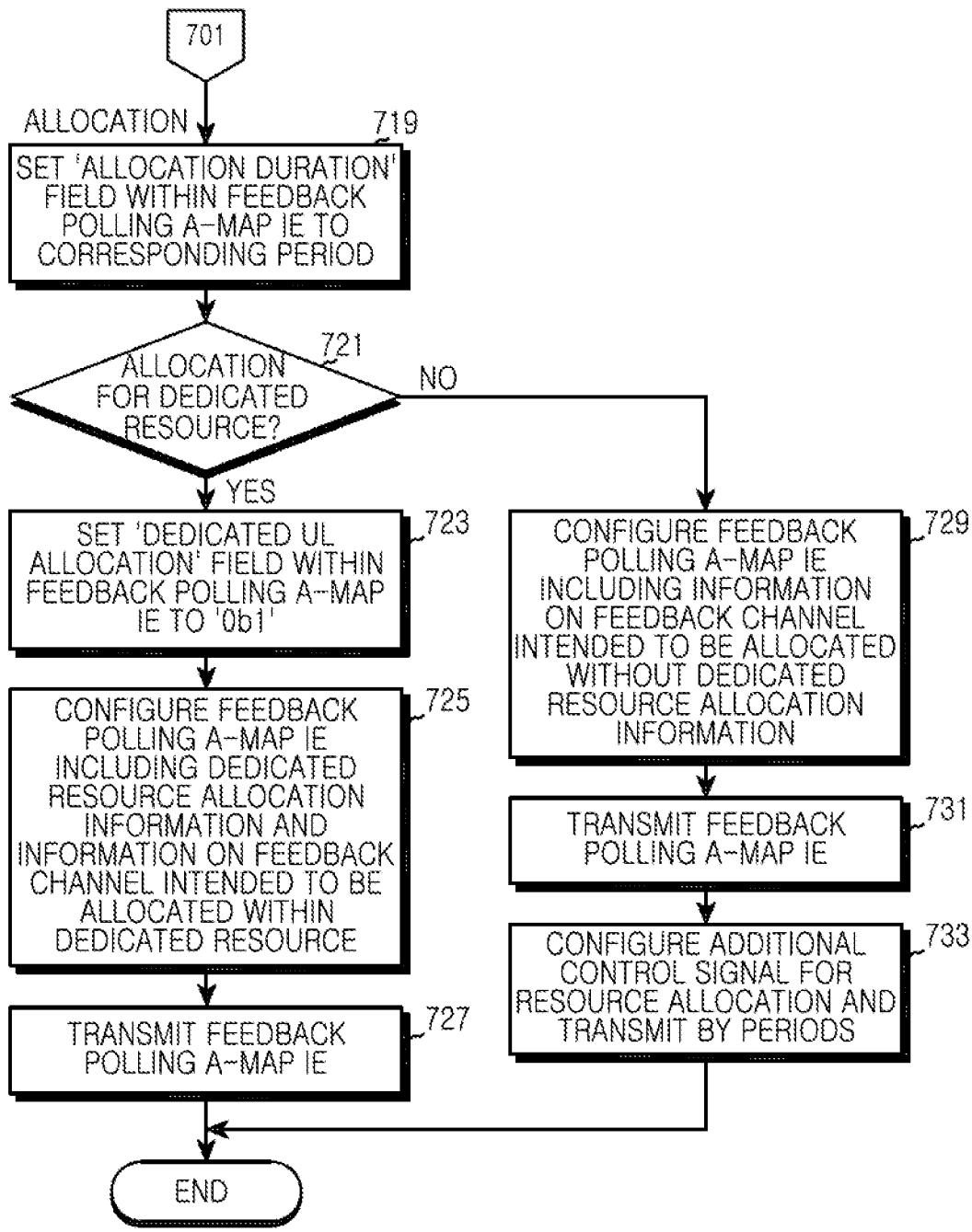

FIGS. 7A and 7B are flowcharts illustrating a method of a BS for, in case of operating a plurality of fast feedback channels per MS, efficiently allocating and deallocating the fast feedback channel in a wireless communication system based on an OFDMA scheme according to an exemplary embodiment of the present invention. Here, the exemplary embodiment relates to a method of operating a fast feedback channel using the Feedback Polling A-MAP IE of Table 3 or 4.

Referring to FIGS. 7A and 7B, in step 701, the BS determines which one of deallocation of an existing allocated fast feedback channel and allocation of a new fast feedback channel is required for an MS.

If it is determined in step 701 that the deallocation of the existing allocated fast feedback channel is required, the BS sets an 'Allocation Duration' field within the Feedback Polling A-MAP IE to '0b000' in step 703. By this, the BS may inform the MS that the Feedback Polling A-MAP IE is a message for deallocation of an existing allocated fast feedback channel.

In step 705, the BS determines if it is a deallocation for existing allocated dedicated resources.

If it is determined in step 705 to be the deallocation for the existing allocated dedicated resources, the BS sets a 'Dedicated UL allocation' field within the Feedback Polling A-MAP IE to '0b0' in step 707. By this, the BS may inform the MS that the Feedback Polling A-MAP IE is the deallocation for the existing allocated dedicated resources.

In step 711, the BS sets allocation information on dedicated resources intended to be deallocated within the Feedback Polling A-MAP IE and activates a bit corresponding to MFMs of one or more feedback channels intended to be deallocated within the dedicated resources in a 'polling_deallocation_bitmap' field, and proceeds to step 713. By this, the BS may distinguish one or more fast feedback channels desired to be deallocated among existing allocated fast feedback channels.

On the other hand, if it is determined in step 705 to be deallocation for existing allocated general resources, the BS activates a bit corresponding to MFMs of one or more feedback channels intended to be deallocated within the general resources in the 'poling deallocation bitmap' field without setting allocation information on dedicated resources intended to be deallocated within the Feedback Polling A-MAP IE in step 709, and proceeds to step 713.

In step 713, the BS allocates a HARQ feedback channel through an 'HFA' field within the Feedback Polling A-MAP IE. In step 715, the BS transmits the above configured Feedback Polling A-MAP IE to the MS.

In step 717, the BS determines if an ACK is received through the allocated HARQ feedback channel from the MS.

If it is determined in step 717 that the ACK is received from the MS, the BS terminates the procedure according to the exemplary embodiment of the present invention.

On the other hand, if it is determined in step 717 that the ACK is not received from the MS within a predefined time, the BS returns to step 715 and performs the subsequent step.

On the other hand, if it is determined in step 701 that the allocation of the new feedback channel is required, the BS sets an 'Allocation Duration' field within the Feedback Polling A-MAP IE to a corresponding period in step 719. By this, the BS may inform the MS that the Feedback Polling A-MAP IE is a message for allocation of a new feedback channel.

In step 721, the BS determines if it is allocation for new dedicated resources.

If it is determined in step 721 to be the allocation for the new dedicated resources, the BS sets a 'Dedicated UL allocation' field within the Feedback Polling A-MAP IE to '0b1' in step 723. By this, the BS may inform the MS that the Feedback Polling A-MAP IE is the allocation for the new dedicated resources.

In step 725, the BS configures a Feedback Polling A-MAP IE, which includes allocation information on dedicated resources intended to be allocated within the Feedback Polling A-MAP IE and information on one or more feedback channels intended to be allocated. In step 727, the BS transmits the configured Feedback Polling A-MAP IE to the MS.

On the other hand, if it is determined in step 721 to be the allocation for the new general resources, the BS configures a Feedback Polling A-MAP IE, which includes information on one or more feedback channels intended to be allocated without allocation information on dedicated resources within the Feedback Polling A-MAP IE in step 729. In step 731, the BS transmits the configured Feedback Polling A-MAP IE to the MS. In step 733, the BS configures an additional control signal for resource allocation, and transmits this to the MS by periods.

After that, the BS terminates the procedure according to the exemplary embodiment of the present invention.

Figure 8A:
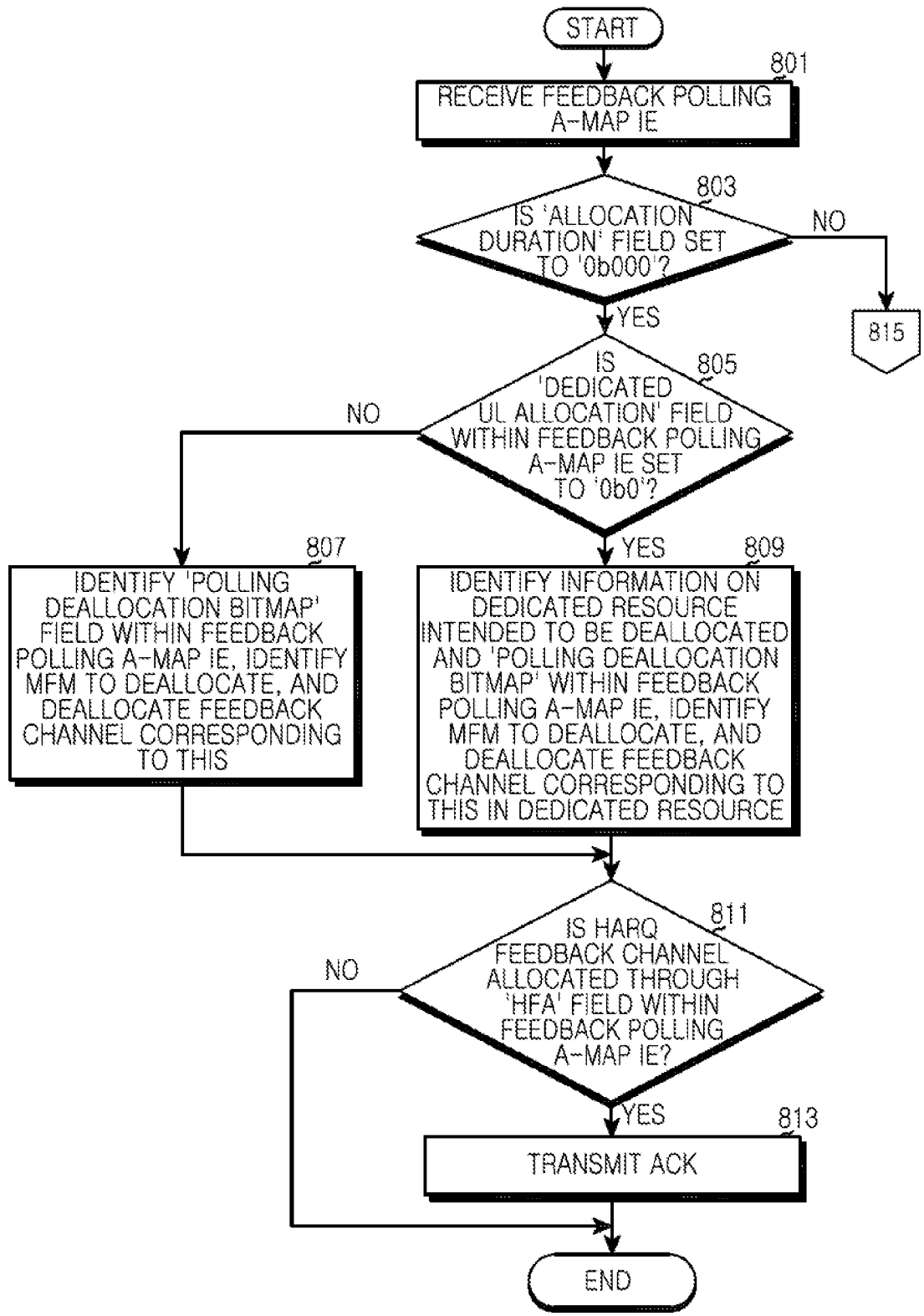
FIGS. 8A and 8B are flowcharts illustrating a method of an MS for, in case of operating a plurality of fast feedback channels per MS, efficiently allocating and deallocating the fast feedback channel in a wireless communication system based on an OFDMA scheme according to an exemplary embodiment of the present invention.
Figure 8B:
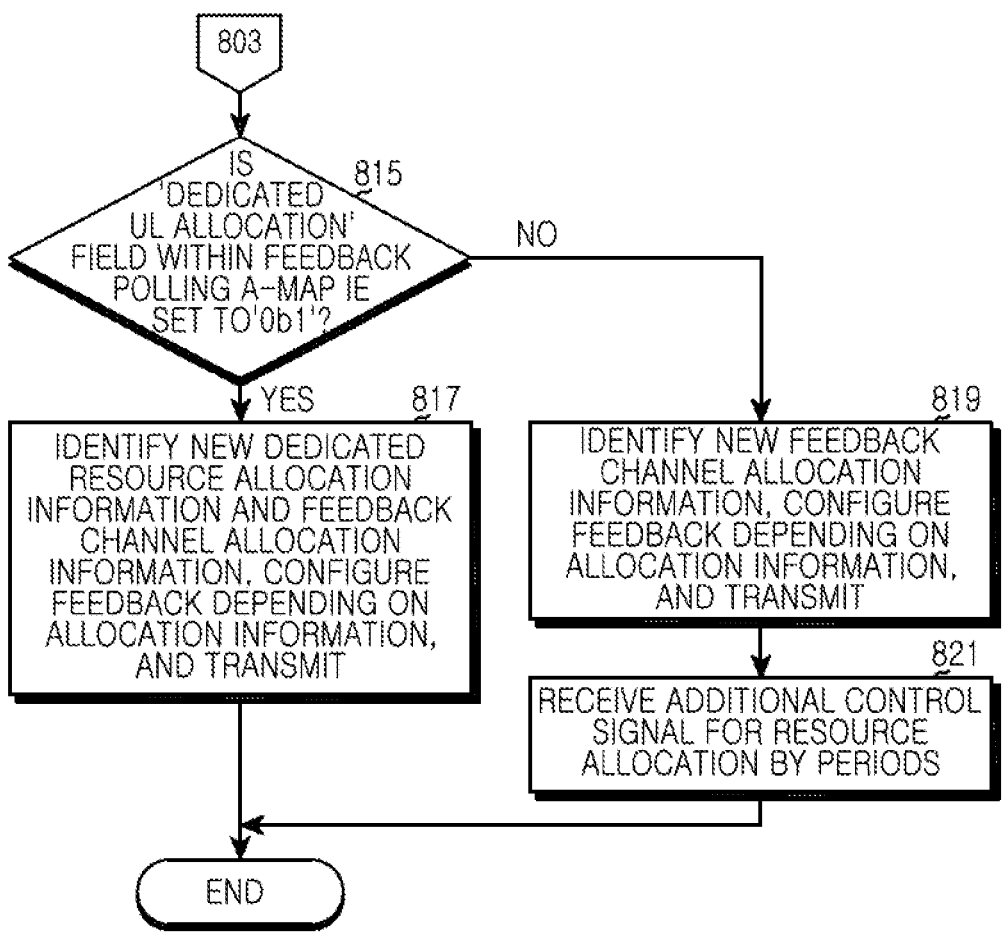

FIGS. 8A and 8B are flowcharts illustrating a method of an MS for efficiently allocating and deallocating the fast feedback channel in a case of operating a plurality of fast feedback channels per MS in a wireless communication system based on an OFDMA scheme according to an exemplary embodiment of the present invention. Here, the exemplary embodiment relates to a method of operating a fast feedback channel using the Feedback Polling A-MAP IE of Table 3 or 4.

Referring to FIGS. 8A and 8B, in step 801, the MS receives a Feedback Polling A-MAP IE from a BS.

In step 803, the MS determines if an 'Allocation Duration' field within the received Feedback Polling A-MAP IE has been set to '0b000'. That is, the BS determines if the received Feedback Polling A-MAP IE is a message for deallocation of an existing allocated fast feedback channel.

If it is determined in step 803 that the 'Allocation Duration' field within the received Feedback Polling A-MAP IE has been set to the '0b000', the MS determines if a 'Dedicated UL allocation' field within the Feedback Polling A-MAP IE has been set to '0b0' in step 805. That is, the MS determines if the received Feedback Polling A-MAP IE is a message for deallocation for an existing allocated dedicated resources.

When it is determined in step 805 that the 'Dedicated UL allocation' field within the Feedback Polling A-MAP IE has not been set to the '0b0', the MS identifies a 'polling_deallocation_bitmap' field within the received Feedback Polling A-MAP IE, identifies an MFM to deallocate, deallocates a fast feedback channel corresponding to the MFM in step 807, and proceeds to step 811. Here, the MS may identify a bit activated in the 'polling_deallocation_bitmap' field, identify an MFM corresponding to the identified bit, and determine that a fast feedback channel corresponding to the identified MFM is a fast feedback channel to deallocate.

On the other hand, if it is determined in step 805 that the 'Dedicated UL allocation' field within the Feedback Polling A-MAP IE has been set to the '0b0', the MS identifies allocation information on dedicated resources intended to be deallocated and the 'polling_deallocation_bitmap' field within the received Feedback Polling A-MAP IE, identifies an MFM to deallocate, deallocates the fast feedback channel corresponding to this in dedicated resources in step 809, and proceeds to step 811. Here, the MS may identify a bit activated in the 'polling_deallocation_bitmap' field, identify an MFM corresponding to the identified bit, and determine the fast feedback channel corresponding to the identified MFM as a fast feedback channel to deallocate.

In step 811, the MS determines if a HARQ feedback channel is allocated through an 'HFA' field within the Feedback Polling A-MAP IE.

If it is determined in step 811 that the HARQ feedback channel is allocated through the 'HFA' field within the Feedback Polling A-MAP IE, the MS proceeds to step 813 and transmits an ACK to the BS through the allocated HARQ feedback channel and terminates the procedure according to the exemplary embodiment of the present invention.

On the other hand, if it is determined in step 811 that the HARQ feedback channel is not allocated through the 'HFA' field within the Feedback Polling A-MAP IE, the MS terminates the procedure according to the exemplary embodiment of the present invention.

On the other hand, if it is determined in step 803 that the 'Allocation Duration' field within the received Feedback Polling A-MAP IE has not been set to '0b000', the MS determines if a 'Dedicated UL allocation' field within the Feedback Polling A-MAP IE has been set to '0b1' in step 815. That is, the MS determines if the received Feedback Polling A-MAP IE is a message for allocation for a new dedicated resource.

If it is determined in step 815 that the 'Dedicated UL allocation' field within the Feedback Polling A-MAP IE has been set to the '0b1', the MS identifies new dedicated resource allocation information and feedback channel allocation information within the Feedback Polling A-MAP IE, configures a feedback depending on the identified allocation information, transmits the feedback to the MS in step 817, and terminates the procedure according to the exemplary embodiment of the present invention.

On the other hand, if it is determined in step 815 that the 'Dedicated UL allocation' field within the Feedback Polling A-MAP IE has not been set to the '0b1', the MS identifies new feedback channel allocation information in the Feedback Polling A-MAP IE, configures a feedback depending on the identified allocation information, and transmits the feedback to the MS in step 819. In step 821, the MS periodically receives an additional control signal for resource allocation.

After that, the MS terminates the procedure according to the exemplary embodiment of the present invention.

As described above, exemplary embodiments of the present invention have an advantage of, in case of operating a plurality of UL fast feedback channels per MS, being capable of commanding the deallocation of a desired one of a plurality of existing allocated fast feedback channels for an MS and furthermore efficiently managing a plurality of fast feedback channels, by including information on the existing allocated fast feedback channel required to be deallocated within a DL control signal in a bitmap form in a wireless communication system based on an OFDMA scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a feedback channel in a Base Station (BS) of a wireless communication system, the method comprising:

generating a message comprising a bitmap indicating at least one feedback channel to be deallocated among feedback channels allocated to a mobile station (MS); and transmitting the message to the MS, wherein each bit of the bitmap corresponds to each of the feedback channels, wherein an ordering of the feedback channels in the bitmap is determined based on feedback information types of the feedback channels, wherein a Most Significant Bit (MSB) of the bitmap indicates whether to deallocate a feedback channel for a Multiple Input Multiple Output (MIMO) Feedback Mode (MFM) having a smallest index among the feedback channels, wherein if any feedback channel for the MFM is not allocated to the MS, the MSB indicates whether to deallocate a feedback channel for a transmitting correlation matrix, and wherein if any feedback channel for the MFM and the feedback channel for the transmitting correlation matrix are not allocated to the MS, the MSB indicates whether to deallocate a feedback channel for a multi-BS MIMO feedback.

2. The method of claim 1, further comprising:
identifying the feedback information types of at least one feedback channel intended to be deallocated among a plurality of existing allocated feedback channels for the MS; and activating at least one bit corresponding to the identified at least one feedback information type in the bitmap.

3. The method of claim 1, wherein the feedback information type comprises at least one of at least one MFM, a transmitting correlation matrix, and a multi-BS MIMO feedback.

4. The method of claim 3, wherein an order of the feedback information type corresponding to each bit in the bitmap is an order of the at least one MFM, the transmitting correlation matrix, and the multi-B S MIMO feedback.

5. The method of claim 1, wherein the message is one of a Feedback Polling Advanced-MAP Information Element (Feedback Polling A-MAP IE) and a Feedback Allocation Advanced-MAP Information Element (Feedback Allocation A-MAP IE).

6. A method for operating a feedback channel in a Mobile Station (MS) of a wireless communication system, the method comprising:
receiving a message comprising a bitmap indicating at least one feedback channel to be deallocated among feedback channels allocated to the MS from a Base Station (BS); and deallocating at least one feedback channel indicated by the bitmap, wherein each bit of the bitmap corresponds to each of distinct the feedback channels, wherein an ordering of the feedback channels in the bitmap is determined based on feedback information types of the feedback channels, wherein a Most Significant Bit (MSB) of the bitmap indicates whether to deallocate a feedback channel for a Multiple Input Multiple Output (MIMO) Feedback Mode (MFM) having a smallest index among the feedback channels, wherein if any feedback channel for the MFM is not allocated to the MS, the MSB indicates whether to deallocate a feedback channel for a transmitting correlation matrix, and wherein if any feedback channel for the MFM and the feedback channel for the transmitting correlation matrix are not allocated to the MS, the MSB indicates whether to deallocate a feedback channel for a multi-BS MIMO feedback.

7. The method of claim 6, further comprising:
when the message is received, identifying at least one bit activated in the bitmap; and identifying at least one feedback channel required to be deallocated based on the at least one bit activated.

8. The method of claim 6, wherein the feedback information type comprises at least one of at least one MFM, a transmitting correlation matrix, and a multi-BS MIMO feedback.

9. The method of claim 8, wherein an order of the feedback information type corresponding to each bit in the bitmap is an order of the at least one MFM, the transmitting correlation matrix, and the multi-B S MIMO feedback.

10. The method of claim 6, wherein the message is one of a Feedback Polling Advanced-MAP Information Element (Feedback Polling A-MAP IE) and a Feedback Allocation Advanced-MAP Information Element (Feedback Allocation A-MAP IE).

11. An apparatus of a Base Station (BS) for operating a feedback channel in a wireless communication system, the apparatus comprising:
a generator for generating a message comprising a bitmap indicating at least one feedback channel to be deallocated among feedback channels allocated to a mobile station (MS); and a transmitter for transmitting the message to the MS, wherein each bit of the bitmap corresponds to each of the feedback channels, wherein an ordering of the feedback channels in the bitmap is determined based on feedback information types of the feedback channels, wherein a Most Significant Bit (MSB) of the bitmap indicates whether to deallocate a feedback channel for a Multiple Input Multiple Output (MIMO) Feedback Mode (MFM) having a smallest index among the feedback channels, wherein if any feedback channel for the MFM is not allocated to the MS, the MSB indicates whether to deallocate a feedback channel for a transmitting correlation matrix, and wherein if any feedback channel for the MFM and the feedback channel for the transmitting correlation matrix are not allocated to the MS, the MSB indicates whether to deallocate a feedback channel for a multi-BS MIMO feedback.

12. The apparatus of claim 11, wherein the generator identifies the feedback information types of at least one feedback channel intended to be deallocated among a plurality of existing allocated feedback channels for the MS, and activates at least one bit corresponding to the identified at least one feedback information type in a bitmap.

13. The apparatus of claim 11, wherein the feedback information type comprises at least one of at least one MFM, a transmitting correlation matrix, and a multi-BS MIMO feedback.

14. The apparatus of claim 13, wherein an order of the feedback information type corresponding to each bit in the bitmap is an order of the at least one MFM, the transmitting correlation matrix, and the multi-BS MIMO feedback.

15. The apparatus of claim 11, wherein the message is one of a Feedback Polling Advanced-MAP Information Element (Feedback Polling A-MAP IE) and a Feedback Allocation Advanced-MAP Information Element (Feedback Allocation A-MAP IE).

16. An apparatus of a Mobile Station (MS) for operating a feedback channel in a wireless communication system, the apparatus comprising:

a receiver for receiving a message comprising a bitmap indicating at least one feedback channel to be deallocated among feedback channels allocated to the MS from a Base Station (BS); and a processor for deallocating at least one feedback channel indicated by the bitmap, wherein each bit of the bitmap corresponds to each of the feedback channels, wherein an ordering of the feedback channels in the bitmap is determined based on feedback information types of the feedback channels, wherein a Most Significant Bit (MSB) of the bitmap indicates whether to deallocate a feedback channel for a Multiple Input Multiple Output (MIMO) Feedback Mode (MFM) having a smallest index among the feedback channels, wherein if any feedback channel for the MFM is not allocated to the MS, the MSB indicates whether to deallocate a feedback channel for a transmitting correlation matrix, and wherein if any feedback channel for the MFM and the feedback channel for the transmitting correlation matrix are not allocated to the MS, the MSB indicates whether to deallocate a feedback channel for a multi-BS MIMO feedback.

17. The apparatus of claim 16, wherein the processor identifies at least one bit activated in the bitmap, and identifies at least one feedback channel required to be deallocated based on the at least one bit activated.

18. The apparatus of claim 16, wherein the feedback information type comprises at least one of at least one MFM, a transmitting correlation matrix, and a multi-BS MIMO feedback.

19. The apparatus of claim 18, wherein an order of the feedback information type corresponding to each bit in the bitmap is an order of the at least one MFM, the transmitting correlation matrix, and the multi-BS MIMO feedback.

20. The apparatus of claim 16, wherein the message is one of a Feedback Polling Advanced-MAP Information Element (Feedback Polling A-MAP IE) and a Feedback Allocation Advanced-MAP Information Element (Feedback Allocation A-MAP IE).

* * * * *